US012238504B2

(12) United States Patent
Herre et al.

(10) Patent No.: US 12,238,504 B2
(45) Date of Patent: Feb. 25, 2025

(54) APPARATUS AND METHOD FOR REPRODUCING A SPATIALLY EXTENDED SOUND SOURCE OR APPARATUS AND METHOD FOR GENERATING A DESCRIPTION FOR A SPATIALLY EXTENDED SOUND SOURCE USING ANCHORING INFORMATION

(71) Applicant: Fraunhofer-Gesellschaft zur Förderung der angewandten Forschung e.V., Munich (DE)

(72) Inventors: Jürgen Herre, Erlangen (DE); Alexander Adami, Erlangen (DE); Frank Wefers, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 60 days.

(21) Appl. No.: 17/811,941

(22) Filed: Jul. 12, 2022

(65) Prior Publication Data

US 2022/0377489 A1 Nov. 24, 2022

Related U.S. Application Data

(63) Continuation of application No. PCT/EP2021/050588, filed on Jan. 13, 2021.

(30) Foreign Application Priority Data

Jan. 14, 2020 (EP) .................................... 20151852

(51) Int. Cl.
*H04S 7/00* (2006.01)

(52) U.S. Cl.
CPC .......... *H04S 7/303* (2013.01); *H04S 2400/01* (2013.01)

(58) Field of Classification Search
None
See application file for complete search history.

(56) References Cited

U.S. PATENT DOCUMENTS

2006/0120534 A1 6/2006 Seo et al.
2014/0358567 A1 12/2014 Koppens
(Continued)

FOREIGN PATENT DOCUMENTS

CN 104054126 A 9/2014
EP 3720149 A1 * 10/2020
(Continued)

OTHER PUBLICATIONS

Japanese language office action dated Dec. 5, 2023, issued in application No. JP 2022-543076.
(Continued)

*Primary Examiner* — Qin Zhu
(74) *Attorney, Agent, or Firm* — McClure, Qualey & Rodack, LLP

(57) ABSTRACT

An apparatus for reproducing a spatially extended sound source having a defined position or orientation and geometry in a space has an interface for receiving a listener position. The apparatus having a projector for calculating a projection of a two- or three-dimensional hull associated with the sound source onto a projection plane using the listener position, information on the geometry of the sound source, and on the position of the sound source; a sound position calculator for calculating positions of at least two sound sources for the spatially extended sound source using the projection plane; and a renderer for rendering the at least two sound sources at the positions to obtain a reproduction of the
(Continued)

sound source having two or more output signals, configured to use different sound signals for the different positions.

43 Claims, 15 Drawing Sheets

(56) References Cited

U.S. PATENT DOCUMENTS

| | | | | |
|---|---|---|---|---|
| 2016/0366530 | A1 | 12/2016 | Peters | |
| 2017/0325045 | A1 | 11/2017 | Baek | |
| 2018/0213344 | A1* | 7/2018 | Laaksonen | G06F 3/012 |
| 2019/0174246 | A1 | 6/2019 | De Bruijn et al. | |
| 2021/0289309 | A1* | 9/2021 | Herre | H04S 7/303 |

FOREIGN PATENT DOCUMENTS

| | | | | |
|---|---|---|---|---|
| EP | 3745745 | A1 * | 12/2020 | H04S 7/304 |
| JP | 2006-503491 | A | 1/2006 | |
| WO | WO-2020127329 | A1 * | 6/2020 | H04S 7/303 |

OTHER PUBLICATIONS

English language translation of office action dated Dec. 5, 2023 (pp. 1-7 of attachment).
International Search Report and Written Opinion issued in application No. PCT/EP2021/050588.
Alary, B., et al.; "Velvet Noise Decorrelator;" Proceedings of the 20th International Conference on Digital Audio Effects; Sep. 2017; pp. DAFX405-DAFX411.
Baumgarte, F., et al.; "Binaural Cue Coding-Part I: Psychoacoustic Fundamentals and Design Principles;" IEEE Transactions On Speech and Audio Processing; vol. 11; No. 6; Nov. 2003; pp. 509-519.
Blauert, J.; "Spatial hearing: The Psychophysics of Human Sound Localization;" MIT Press; 2001; pp. 1-86.
Faller, C., et al.; "Binaural Cue Coding-Part II: Schemes and Applications;" IEEE Transactions On Speech and Audio Processing, vol. 11, No. 6, Nov. 2003; pp. 520-531.
Kendall, G.S.; "The Decorrelation of Audio Signals and Its Impact on Spatial Imagery;" Computer Music Journal, 19; 1995; pp. 71-87.
Lauridsen, H.; "Experiments Concerning Different Kinds of Room-Acoustics Recording;" Ingenioren 47; pp. 906-910.
Pihlajamaki, T., et al.; "Synthesis of Spatially Extended Virtual Source with Time-Frequency Decomposition of Mono Signals;" Journal of the Audio Engineering Society, 62; 2014; pp. 467-484.
Potard, G., et al.; "A study on sound source apparent shape and wideness;" Proceedings of the 2003 International Conference on Auditory Display; Jul. 2003; pp. ICAD03-26 thru ICAD03-28.
Potard, G., et al.; "Decorrelation Techniques for the Rendering of Apparent Sound Source Width in 3D Audio Displays;" Proceedings of the 7th International Conference on Digital Audio Effects (DAFx'04); Oct. 2004; pp. 280-284.
Pulkki, V.; "Virtual Sound Source Positioning Using Vector Base Amplitude Panning;" Journal of the Audio Engineering Society; 1997; pp. 456-466.
Pulkki, V.; "Uniform spreading of amplitude panned virtual sources;" Proc. 1999 IEEE Workshop on Applications of Signal Processing to Audio and Acoustics; Oct. 1999; pp. W99-1 thru W99-4.
Pulkki, V.; "Spatial Sound Reproduction with Directional Audio Coding;" J. Audio Eng. Soc, 55; 2007; pp. 503-516.
Pulkki, V., et al.; "Efficient Spatial Sound Synthesis for Virtual Worlds;" AES 35th International Conference; Feb. 2009; pp. 1-10.
Schlecht, S., et al.; "Optimized Velvet-Noise Decorrelator;" Proceedings of the 21th International Conference on Digital Audio Effects (DAFx-18); Sep. 2018; pp. DAFX-1 thru DAFX-8.
Schmele, T., et al.; "Controlling the Apparent Source Size in Ambisonics Unisng Decorrelation Filters;" Audio Engineering Society Conference Paper Presented at the Conference on Spatial Reproduction; Aug. 2018; pp. 1-7.
Schmidt, J., et al.; "New and Advanced Features for Audio Presentation in the MPEG-4 Standard;" Audio Engineering Society Convention Paper 6058 Presented at the 116th Convention; May 2004; pp. 1-13.
Verron, C., et al.; A 3-D Immersive Synthesizer for Environmental Sounds; IEEE Transactions on Audio, Speech, and Language Processing; vol. 18; No. 6; Aug. 2010; pp. 1550-1561.
Zotter, F., et al.; "Efficient Phantom Source Widening;" Archives of Acoustics; 2013; pp. 27-37.
Audio Sub Group; "Approved WG 11 document;" Coding of moving pictures and audio Convenorship: UNI; 21. International Organisation for Standardisation Organisation Internationale De Normalisation ISO/IEC JTC1/SC29/WG11, Coding of Moving Pictures and Audio, MPEG2019/N18807; Oct. 2019; pp. 1-27.
Hakala, M.; "Synthesis of Spatially Extended Sources in Virtual Reality Audio;" Aug. 2019; pp. 1-69.
Schmidt, J., et al.; "New and Advanced Features for Audio Presentation in the MPEG-4 Standard", AES Convention; May 2004; pp. 1-13.
Zotter, F., et al.; "Efficient Phantom Source Widening and Diffuseness in Ambisonics;" Proc. of the EAA Joint Symposium on Auralization and Ambisonics; Apr. 2014; pp. 69-74.
Chinese language office action dated Dec. 31, 2024, issued in application No. CN 202180021195.6.

* cited by examiner

Spherical SESS with different numbers (i.e., 3 (top), 5 (middle), and 8 (bottom)) of PPSs uninformly distributed on the convex hull.

Piano-Shaped SESS (depicted in green) with an approximative parametric ellipsoid shape (indicated as a red mesh)

| | | |
|---|---|---|
| TL<br>top-left | T<br>top | TR<br>top-right |
| L<br>left | C<br>center | R<br>right |
| BL<br>bottom-left | B<br>bottom | BR<br>rottom-right |

APPARATUS AND METHOD FOR REPRODUCING A SPATIALLY EXTENDED SOUND SOURCE OR APPARATUS AND METHOD FOR GENERATING A DESCRIPTION FOR A SPATIALLY EXTENDED SOUND SOURCE USING ANCHORING INFORMATION

CROSS-REFERENCE TO RELATED APPLICATIONS

This application is a continuation of copending International Application No. PCT/EP2021/050588, filed Jan. 13, 2021, which is incorporated herein by reference in its entirety, and additionally claims priority from European Application No. 20151852.9, filed Jan. 14, 2020, which is also incorporated herein by reference in its entirety.

TECHNICAL FIELD

The present invention relates to audio signal processing and particularly to the encoding or decoding or reproducing of a spatially extended sound source.

BACKGROUND OF THE INVENTION

The reproduction of sound sources over several loudspeakers or headphones has been long investigated. The simplest way of reproducing sound sources over such setups is to render them as point sources, i.e., very (ideally: infinitely) small sound sources. This theoretic concept, however, is hardly able to model existing physical sound sources in a realistic way. For instance, a grand piano has a large vibrating wooden closure with many spatially distributed strings inside and thus appears much larger in auditory perception than a point source (especially when the listener (and the microphones) are close to the grand piano. Many real-world sound sources have a considerable size ("spatial extent") like musical instruments, machines, an orchestra or choir or ambient sounds (sound of a waterfall).

Correct/realistic reproduction of such sound sources has become the target of many sound reproduction methods, be it binaural (i.e., using so-called Head-Related Transfer Functions HRTFs or Binaural Room Impulse Responses BRIRs) using headphones or conventionally using loudspeaker setups ranging from 2 speakers ("stereo") to many speakers arranged in a horizontal plane ("Surround Sound") and many speakers surrounding the listener in all three dimensions ("3D Audio").

It is an object of the present invention to provide a concept for encoding or reproducing a Spatially Extended Sound Sources with a possibly complex geometric shape.

2D Source Width

This section describes methods that pertain to rendering extended sound sources on a 2D surface faced from the point of view of a listener, e.g., in a certain azimuth range at zero degrees of elevation (like is the case in conventional stereo/surround sound) or certain ranges of azimuth and elevation (like is the case in 3D Audio or virtual reality with 3 degrees of freedom ["3DoF"] of the user movement, i.e., head rotation in pitch/yaw/roll axes).

Increasing the apparent width of an audio object which is panned between two or more loudspeakers (generating a so-called phantom image or phantom source) can be achieved by decreasing the correlation of the participating channel signals (Blauert, 2001, S. 241-257). With decreasing correlation, the phantom source's spread increases until, for correlation values close to zero (and not too wide opening angles), it covers the whole range between the loudspeakers.

Decorrelated versions of a source signal are obtained by deriving and applying suitable decorrelation filters. Lauridsen (Lauridsen, 1954) proposed to add/subtract a time delayed and scaled version of the source signal to itself in order to obtain two decorrelated versions of the signal. More complex approaches were for example proposed by Kendall (Kendall, 1995). He iteratively derived paired decorrelation all-pass filters based on combinations of random number sequences. Faller et al. propose suitable decorrelation filters ("diffusers") in (Baumgarte & Faller, 2003) (Faller & Baumgarte, 2003). Also Zotter et al. derived filter pairs in which frequency-dependent phase or amplitude differences were used to achieve widening of a phantom source (Zotter & Frank, 2013). Furthermore, (Alary, Politis, & Valimaki, 2017) proposed decorrelation filters based on velvet noise which were further optimized by (Schlecht, Alary, Valimaki, & Habets, 2018).

Besides reducing correlation of the phantom source's corresponding channel signals, source width can also be increased by increasing the number of phantom sources attributed to an audio object. In (Pulkki, 1999), the source width is controlled by panning the same source signal to (slightly) different directions. The method was originally proposed to stabilize the perceived phantom source spread of VBAP-panned (Pulkki, 1997) source signals when they are moved in the sound scene. This is advantageous since dependent on a source's direction, a rendered source is reproduced by two or more speakers which can result in undesired alterations of perceived source width.

Virtual world DirAC (Pulkki, Laitinen, & Erkut, 2009) is an extension of the traditional Directional Audio Coding (DirAC) (Pulkki, 2007) approach for sound synthesis in virtual worlds. For rendering spatial extent, directional sound components of a source are randomly panned within a certain range around the source's original direction, where panning directions vary with time and frequency.

A similar approach is pursued in (Pihlajamäki, Santala, & Pulkki, 2014), where spatial extent is achieved by randomly distributing frequency bands of a source signal into different spatial directions. This is a method aiming at producing a spatially distributed and enveloping sound coming equally from all directions rather than controlling an exact degree of extent.

Verron et al. achieved spatial extent of a source by not using panned correlated signals, but by synthesizing multiple incoherent versions of the source signal, distributing them uniformly on a circle around the listener, and mixing between them (Verron, Aramaki, Kronland-Martinet, & Pallone, 2010). The number and gain of simultaneously active sources determine the intensity of the widening effect. This method was implemented as a spatial extension to a synthesizer for environmental sounds.

3D Source Width

This section describes methods that pertain to rendering extended sound sources in 3D space, i.e. in a volumetric way as it is used for virtual reality with 6 degrees of freedom ("6DoF"). This means 6 degrees of freedom of the user movement, i.e. head rotation in pitch/yaw/roll axes) plus 3 translational movement directions x/y/z.

Potard et al. extended the notion of source extent as a one-dimensional parameter of the source (i.e., its width between two loudspeakers) by studying the perception of source shapes (Potard, 2003). They generated multiple incoherent point sources by applying (time-varying) decorrelation techniques to the original source signal and then placing the incoherent sources to different spatial locations and by this giving them three-dimensional extent (Potard & Burnett, 2004).

In MPEG-4 Advanced AudioBIFS (Schmidt & Schröder, 2004), volumetric objects/shapes (shuck, box, ellipsoid and cylinder) can be filled with several equally distributed and decorrelated sound sources to evoke three-dimensional source extent.

In order to increase and control source extent using Ambisonics, Schmele at al. (Schmele & Sayin, 2018) proposed a mixture of reducing the Ambisonics order of an input signal, which inherently increases the apparent source width, and distributing decorrelated copies of the source signal around the listening space.

Another approach was introduced by Zotter et al., where they adopted the principle proposed in (Zotter & Frank, 2013) (i.e., deriving filter pairs that introduce frequency-dependent phase and magnitude differences to achieve source extent in stereo reproduction setups) for Ambisonics (Zotter F., Frank, Kronlachner, & Choi, 2014).

A common disadvantage of panning-based approaches (e.g., (Pulkki, 1997) (Pulkki, 1999) (Pulkki, 2007) (Pulkki, Laitinen, & Erkut, 2009)) is their dependency on the listener's position. Even a small deviation from the sweet spot causes the spatial image to collapse into the loudspeaker closest to the listener. This drastically limits their application in the context of virtual reality and augmented reality with 6 degrees-of-freedom (6DoF) where the listener is supposed to freely move around. Additionally, distributing time-frequency bins in DirAC-based approaches (e.g., (Pulkki, 2007) (Pulkki, Laitinen, & Erkut, 2009)) not always guarantees the proper rendering of the spatial extent of phantom sources. Moreover, it typically significantly degrades the source signal's timbre.

Decorrelation of source signals is usually achieved by one of the following methods: i) deriving filter pairs with complementary magnitude (e.g. (Lauridsen, 1954)), ii) using all-pass filters with constant magnitude but (randomly) scrambled phase (e.g., (Kendall, 1995) (Potard & Burnett, 2004)), or iii) spatially randomly distributing time-frequency bins of the source signal (e.g., (Pihlajamäki, Santala, & Pulkki, 2014)).

All approaches come with their own implications: Complementary filtering a source signal according to i) typically leads to an altered perceived timbre of the decorrelated signals. While all-pass filtering as in ii) preserves the source signal's timbre, the scrambled phase disrupts the original phase relations and especially for transient signals causes severe temporal dispersion and smearing artifacts. Spatially distributing time-frequency bins proved to be effective for some signals, but also alters the signal's perceived timbre. Furthermore, it showed to be highly signal dependent and introduces severe artifacts for impulsive signals.

Populating volumetric shapes with multiple decorrelated versions of a source signal as proposed in Advanced AudioBIFS ((Schmidt & Schröder, 2004) (Potard, 2003) (Potard & Burnett, 2004)) assumes availability of a large number of filters that produce mutually decorrelated output signals (typically, more than ten point sources per volumetric shape are used). However, finding such filters is not a trivial task and becomes more difficult the more such filters are needed. Furthermore, if the source signals are not fully decorrelated and a listener moves around such a shape, e.g., in a (virtual reality) scenario, the individual source distances to the listener correspond to different delays of the source signals and their superposition at the listener's ears result in position dependent comb-filtering potentially introducing annoying unsteady coloration of the source signal.

Controlling source width with the Ambisonics-based technique in (Schmele & Sayin, 2018) by lowering Ambisonics order showed to have an audible effect only for transitions from 2nd to 1st or to 0th order. Furthermore, these transitions are not only perceived as a source widening but also frequently as a movement of the phantom source. While adding decorrelated versions of the source signal could help stabilizing the perception of apparent source width, it also introduces comb-filter effects that alter the phantom source's timbre.

SUMMARY

According to an embodiment, an apparatus for reproducing a spatially extended sound source having a defined position or orientation and geometry in a space may have: an interface for receiving a listener position; a projector for calculating a projection of a two-dimensional or three-dimensional hull associated with the spatially extended sound source onto a projection plane using the listener position, information on the geometry of the spatially extended sound source, and information on the position of the spatially extended sound source; a sound position calculator for calculating positions of at least two sound sources for the spatially extended sound source using the projection plane; and a renderer for rendering the at least two sound sources at the positions to obtain a reproduction of the spatially extended sound source having two or more output signals, wherein the renderer is configured to use different sound signals for the different positions, wherein the different sound signals are associated with the spatially extended sound source, wherein the renderer is configured for rendering the at least two sound sources relative to a fixed location and/or orientation of the spatially extended sound source in response to a specific information received.

According to another embodiment, an apparatus for generating a description for a spatially extended sound source may have: a sound provider for providing one or more different sound signals for the spatially extended sound source; a geometry provider for calculating information on a geometry for the spatially extended sound source; and an output data former for generating the description, the description having the one or more different sound signals, and the information on the geometry, wherein the output data former is configured to introduce, into the description, an information or description element or flag indicating an absolute anchoring of the one or more different sound signals for the spatially extended sound source to a location or orientation of the spatially extended sound source.

According to another embodiment, a method for reproducing a spatially extended sound source having a defined position or orientation and geometry in a space may have the steps of: receiving a listener position; calculating a projection of a two-dimensional or three-dimensional hull associated with the spatially extended sound source onto a projection plane using the listener position, information on the geometry of the spatially extended sound source, and information on the position of the spatially extended sound source; calculating positions of at least two sound sources for the spatially extended sound source using the projection plane; and rendering the at least two sound sources at the positions to obtain a reproduction of the spatially extended sound source having two or more output signals, wherein the rendering includes using different sound signals for the different positions, wherein the different sound signals are associated with the spatially extended sound source, wherein the rendering includes rendering the at least two sound sources relative to a fixed location and/or orientation of the spatially extended sound source in response to a specific information received.

According to still another embodiment, a method of generating a description for a spatially extended sound source may have the steps of: providing one or more different sound signals for the spatially extended sound source; providing information on a geometry for the spatially extended sound source; and generating the description, the description having the one or more different sound signals, and the information on the geometry for the spatially extended sound source, wherein the generating includes introducing, into the description, a flag, a description element or an information indicating an absolute anchoring of the one or more different sound signals for the spatially extended sound source to a location or orientation of the spatially extended sound source.

According to another embodiment, a description for a spatially extended sound source may have: one or more different sound signals for the spatially extended sound source; and information on a geometry for the spatially extended sound source; and a flag or a description element or an information indicating an absolute anchoring of the one or more different sound signals for the spatially extended sound source to a location or orientation of the spatially extended sound source.

Another embodiment may have a non-transitory digital storage medium having stored thereon a computer program for performing a method for reproducing a spatially extended sound source having a defined position or orientation and geometry in a space, the method having the steps of: receiving a listener position; calculating a projection of a two-dimensional or three-dimensional hull associated with the spatially extended sound source onto a projection plane using the listener position, information on the geometry of the spatially extended sound source, and information on the position of the spatially extended sound source; calculating positions of at least two sound sources for the spatially extended sound source using the projection plane; and rendering the at least two sound sources at the positions to obtain a reproduction of the spatially extended sound source having two or more output signals, wherein the rendering includes using different sound signals for the different positions, wherein the different sound signals are associated with the spatially extended sound source, wherein the rendering includes rendering the at least two sound sources relative to a fixed location and/or orientation of the spatially extended sound source in response to a specific information received, when said computer program is run by a computer.

Another embodiment may have a non-transitory digital storage medium having stored thereon a computer program for performing a method of generating a description for a spatially extended sound source, the method having the steps of: providing one or more different sound signals for the spatially extended sound source; providing information on a geometry for the spatially extended sound source; and generating the description, the description having the one or more different sound signals, and the information on the geometry for the spatially extended sound source, wherein the generating includes introducing, into the description, a flag, a description element or an information indicating an absolute anchoring of the one or more different sound signals for the spatially extended sound source to a location or orientation of the spatially extended sound source, when said computer program is run by a computer.

The present invention is based on the finding that a reproduction of a spatially extended sound source can be achieved and, particularly, even rendered possible by means of calculating a projection of a two-dimensional or a three-dimensional hull associated with a spatially extended sound source onto a projection plane using a listener position. This projection is used for calculating positions of at least two sound sources for the spatially extended sound source and, the at least two sound sources are rendered at the positions to obtain a reproduction of the spatially extended sound source, where the rendering results in two or more output signals, and where different sound signals for the different positions are used, but the different sound signals are all associated with one and the same spatially extended sound source.

A high-quality two-dimensional or three-dimensional audio reproduction is obtained, since, on the one hand, a time-varying relative position between the spatially extended sound source and the (virtual) listener position is accounted for. The listener position can comprise the geometric position of the user only, or can be the orientation of the user in the space only or can be both the geometric position and the orientation of the user. On the other hand, the spatially extended sound source is efficiently represented by geometry information on the perceived sound source extent and by a number of at least two sound sources such as peripheral point sources that can be easily processed by renderers well-known in the art. The geometry information may be an acoustically effective geometry information. Exemplarily, a curtain is acoustically transparent, while being intransparent from an optical point of view. This situation is different for a thick wall of glass. This wall is optically transparent, but acoustically intransparent. Particularly, straightforward renderers in the art are always in the position to render sound sources at certain positions with respect to a certain output format or loudspeaker setup. For example, two sound sources calculated by the sound position calculator at certain positions can be rendered at these positions by amplitude panning, for example.

When, for example, the sound positions are between left and left surround in a 5.1 output format, and when the other sound sources are between right and right surround in the output format, the amplitude panning procedure performed by the renderer would result in quite similar signals for the left and the left surround channel for one sound source and in correspondingly quite similar signals for right and right surround for the other sound source so that the user perceives the sound sources as coming from the positions calculated by the sound position calculator. However, due to the fact that all four signals are, in the end, associated and related to the spatially extended sound source, the user does not simply perceive two phantom sources associated with the positions calculated by the sound position calculator, but the listener perceives a single spatially extended sound source.

An apparatus for reproducing a spatially extended sound source having a defined position and/or orientation in geometry in a space comprises an interface, a projector, a sound position calculator and a renderer. The present invention allows to account for an enhanced sound situation that occurs, for example, within a piano. A piano is a large device and, up to now, the piano sound may have been rendered as coming from a single point source. This, however, does not fully represent the piano's true sound characteristics. In accordance with the present invention, the piano as an example for a spatially extended sound source is reflected by at least two sound signals, where one sound signal could be recorded by a microphone positioned close to the left portion of the piano, i.e., close to the bass strings, while the other sound source could be recorded by a different second microphone positioned close to the right portion of the piano, i.e., near the treble strings generating high tones. Naturally, both microphones will record sounds that are different from each other due to the reflection situation within the piano and, of course, also due to the fact that a bass string is closer to the left microphone than to the right microphone and vice versa. On the other hand, however, both microphone signals will have a considerable amount of similar sound components that, in the end, make up the unique sound of a piano. Specifically, the renderer is configured for rendering the at least two sound sources relative to a fixed location and/or orientation of the spatially extended sound source in response to a specific information received, i.e., in response to the anchoring information.

In accordance with the present invention, a bitstream representing the spatially extended sound source such as the piano is generated by recording the signals by also recording the geometry information of the spatially extended sound source and, optionally, by also either recording location information related to different microphone positions (or, generally to the two different positions associated with the two different sound sources) or providing a description of the perceived geometric shape of the (piano's) sound. In order to reflect a listener position with respect to the sound sources, i.e., that the listener can "walk around" in a virtual reality or an augmented reality, or any other sound scene, a projection of a hull associated with the spatially extended sound source such as the piano is calculated using the listener position and, positions of the at least two sound sources are calculated using the projection plane, where, particularly, embodiments relate to the positioning of the sound sources at peripheral points of the projection plane. An output data former is configured to introduce, into a description of the spatially extended sound source, an anchoring information or bitstream/description element or flag indicating an absolute anchoring of the one or more different sound signals for the spatially extended sound source to a location or orientation of the spatially extended sound source. The description of the spatially extended sound source can be implemented e.g. as an XML description, a bitstream or a compressed bitstream or any other computer readable format.

It is made possible with reduced calculation overhead and reduced rendering overhead to actually represent the exemplary piano sound in a two-dimensional or three-dimensional situation so that, when the listener, for example, is closer to the left part of the sound source such as the piano, the sound that the listener perceives is different from the sound occurring when the user is located close to the right part of the sound source such as the piano or even behind the sound source such as the piano.

In view of the above, the inventive concept is unique in that, on the encoder-side, a way of characterizing a spatially extended sound source is provided that allows the usage of the spatially extended sound source within a sound reproduction situation for a true two-dimensional or three-dimensional setup. Furthermore, usage of the listener position within the highly flexible description of the spatially extended sound source is made possible in an efficient way by calculating a projection of a two-dimensional or three-dimensional hull onto a projection plane using the listener position. Sound positions of at least two sound sources for the spatially extended sound source are calculated using the projection plane and, the at least two sound sources are rendered at the positions calculated by the sound position calculator to obtain a reproduction of the spatially extended sound source having two or more output signals for a headphone or multichannel output signals for two or more channels in a stereo reproduction setup or a reproduction setup having more than two channels such as five, seven or even more channels.

Compared to the known method of filling a 3D volume with sound by placing many different point sources in all parts of the volume to be filled, the projection avoids having to model many sound sources and reduces the number of employed point sources dramatically by entailing filling only the projection of the hull, i.e. a 2D space. Furthermore, the number of used point sources is reduced even more by modeling advantageously only sources on the hull of the projection which could—in extreme cases—be simply one sound source at the left border of the spatially extended sound source and one sound source at the right border of the spatially extended sound source. Both reduction steps are based on two psychoacoustic observations:

1. In contrast to the azimuth (and elevation) of a sound source, its distance cannot be perceived very reliably. Thus, a projection of the original volume onto a plane perpendicular to the listener, does not alter perception significantly (but can help to reduce the number of point sources needed for rendering).
2. Two decorrelated sounds which are distributed as point sources to the left and the right, respectively, tend to perceptually fill the space between them with sound.

Furthermore, the encoder-side not only allows the characterization of a single spatially extended sound source but is flexible in that the description such as a bitstream generated as the representation can include all data for two or more spatially extended sound sources that may be related, with respect to their geometry information and location to a single coordinate system. On the decoder-side, the reproduction cannot only be done for a single spatially extended sound source but can be done for several spatially extended sound sources, where the projector calculates a projection for each sound source using the (virtual) listener position. Additionally, the sound position calculator calculates positions of the at least two sound sources for each spatially extended sound source, and the renderer renders all the calculated sound sources for each spatially extended sound source, for example, by adding the two or more output signals from each spatially extended sound source in a signal-by-signal way or a channel-by-channel way and by providing the added channels to the corresponding headphones for a binaural reproduction or to the corresponding loudspeakers in a loudspeaker-related reproduction setup or, alternatively, to a storage for storing the (combined) two or more output signals for later use or transmission.

On the generator- or encoder-side, a description is generated using an apparatus for generating the description for a spatially extended sound source where the apparatus comprises a sound provider for providing one or more different sound signals for the spatially extended sound source, and an output data former generates the description of the sound scene, the description comprising the one or more different sound signals advantageously in a compressed way such as compressed by a bitrate compressing encoder, for example an MP3, an AAC, a USAC or an MPEGH encoder. The output data former is furthermore configured to introduce into the description, in case of two or more different sound signals, an optional individual location information for each sound signal of the two or more different sound signals indicating a location of the corresponding sound signal advantageously with respect to the information on the geometry of the spatially extended sound source, i.e., that the first signal is the signal recorded at the left part of a piano in the above example, and a signal recorded at the right side of the piano.

However, alternatively, the location information does not necessarily have to be related to the geometry of the spatially extended sound source but can also be related to a general coordinate origin, although the relation to the geometry of the spatially extended sound source is of advantage.

Furthermore, the apparatus for generating the description also comprises a geometry provider for calculating information on the geometry of the spatially extended sound source and the output data former is configured for introducing, into the description, the information on the geometry, the information on the individual location information for each sound signal, in addition to the at least two sound signals, such as the sound signals as recorded by microphones. However, the sound provider does not necessarily have to actually pick up microphone signals, but the sound signals can also be generated, on the encoder-side using decorrelation processing as the case may be. At the same time, only a small number of sound signals or even a single sound signal can be transmitted for the spatially extended sound signal and the remaining sound signals are generated on the reproduction side using decorrelation processing. This may be signaled by a description or bitstream element in the bitstream so that the sound reproducer always knows how many sound signals are included per spatially extended sound source so that the reproducer can decide, particularly within the sound position calculator, how many sound signals are available and how many sound signals should be derived on the decoder side, such as by signal synthesis or correlation processing.

In this embodiment, the output data former writes a bitstream element into the description or bitstream indicating the number of sound signals included for a spatially extended sound source, and, on the decoder-side, the sound reproducer retrieves the bitstream element from the transmitted description or bitstream, reads the bitstream element and, decides, based on the bitstream element, how many signals for the advantageously peripheral point sources or the auxiliary sources placed in between the peripheral sound sources have to be calculated based on the at least one received sound signal in the bitstream. The description of the spatially extended sound source can be implemented e.g. as an XML description, a bitstream or a compressed bitstream or any other computer readable format

BRIEF DESCRIPTION OF THE DRAWINGS

Embodiments of the present invention are discussed below with respect to the accompanying drawings, in which.

DETAILED DESCRIPTION OF THE INVENTION

Figure 9:
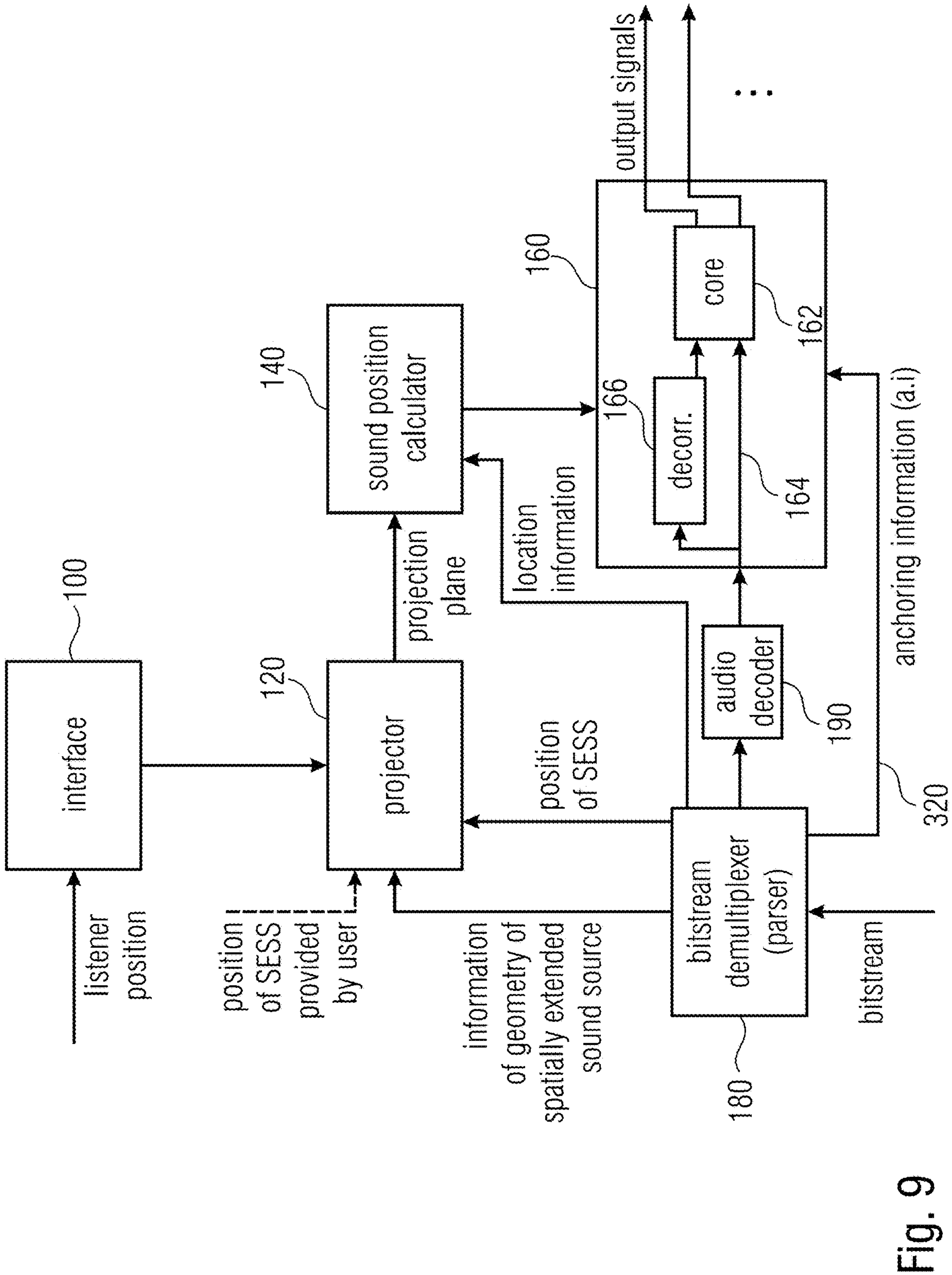
FIG. 9 illustrates an implementation of the apparatus or method for reproducing a spatially extended sound source.

FIG. 9 illustrates an implementation of an apparatus for reproducing a spatially extended sound source having a defined position or orientation and geometry in a space. The apparatus comprises an interface 100, a projector 120, a sound position calculator 140 and a renderer 160. The interface is configured for receiving a listener position. Furthermore, the projector 120 is configured for calculating a projection of a two-dimensional or three-dimensional hull associated with the spatially extended sound source onto a projection plane using the listener position as received by the interface 100 and using, additionally, information on the geometry of the spatially extended sound source and, additionally, using an information on the position of the spatially extended sound source in the space. Advantageously, the defined position or orientation of the spatially extended sound source in the space and, additionally, the geometry of the spatially extended sound source in the space is received for reproducing a spatially extended sound source via a bitstream or description arriving at a demultiplexer or scene or description parser 180. The demultiplexer 180 extracts, from the description, the information of the geometry of the spatially extended sound source and provides this information to the projector. Furthermore, the demultiplexer also extracts the position of the spatially extended sound source from the description or bitstream and forwards this information to the projector. Advantageously, the description also comprises location information for the at least two different sound sources and, advantageously, the demultiplexer also extracts, from the description, a compressed representation of the at least two sound sources, and the at least two sound sources are decompressed/decoded by a decoder as an audio decoder 190. The decoded at least two sound sources are finally forwarded to the renderer 160, and the renderer renders the at least two sound sources at the positions as provided by the sound position calculator 140 to the renderer

160. Specifically, the renderer 160 is configured for rendering the at least two sound sources relative to a fixed location and/or orientation of the spatially extended sound source in response to a specific information received, i.e., in response to the anchoring information. The description of the spatially extended sound source can be implemented e.g. as an XML description, a bitstream or a compressed bitstream or any other computer readable format The usage of the anchoring information particularly applies for spatially extended sound sources that are defined by multi-channel signals. In this scenario, each individual channel has an associated alignment information. This alignment information can be, e.g., a left alignment for a left channel and a right alignment for a right channel. Depending on the anchoring mode used, i.e., depending on whether the anchoring mode is the "user alignment" mode or the "object alignment" mode, and depending on the positioning information a certain channel of the multi-channel signal is mapped to a peripheral sound source. Thus, based on the position and orientation of the observer, i.e., the listening position, and based on the anchoring mode, the channels or waveforms are mapped to the peripheral sound sources, and are used by the renderer. Thus, in this embodiment, the anchoring mode is used for interpreting the positioning information as being either user related or object related. The at least two sound sources as determined by the sound position calculator are, therefore, rendered by the renderer in response to the anchoring information.

Although FIG. 9 illustrates a bitstream-related reproduction apparatus having a bitstream demultiplexer 180 and an audio decoder 190, the reproduction can also take place in a situation different from an encoder/decoder scenario. For example, the defined position or orientation and geometry in space can already exist at the reproduction apparatus such as in a virtual reality or augmented reality scene, where the data is generated on site and is consumed on the same site. The bitstream demultiplexer 180 and the audio decoder 190 are not actually necessary, and the information of the geometry of the spatially extended sound source and the position of the spatially extended sound source are available without any extraction from a bitstream. Furthermore, the location information relating the location of the at least two sound sources to the geometry information of the spatially extended sound source can also be fixedly negotiated in advance and, therefore, do not have to be transmitted from an encoder to a decoder or, alternatively, this data is generated, again, on site.

Hence, it is to be noted that the location information is only provided in embodiments and there is no need to transmit this information even in case of two or more sound source signals. The decoder or reproducer, for example, can always take the first sound source signal in the bitstream or description as a sound source on the projection being placed more to the left. Similarly, the second sound source signal in the bitstream can be taken as a sound source on the projection being placed more to the right.

Furthermore, although the sound position calculator calculates positions of at least two sound sources for the spatially extended sound source using the projection plane, the at least two sound sources do not necessarily have to be received from a description or bitstream. Instead, only a single sound source of the at least two sound sources can be received via the bitstream and the other sound source and, therefore, also the other position or location information can be actually generated on the reproduction side only without the need to transmitting such information from a description generator to the reproducer. However, in other embodiments, all this information can be transmitted and, additionally, a higher number than one or two sound signals can be transmitted in the bitstream, when the bitrate requirements are not tight, and, the audio decoder 190 would decode two, three, or even more sound signals representing the at least two sound sources whose positions are calculated by the sound position calculator 140.

Figure 10:
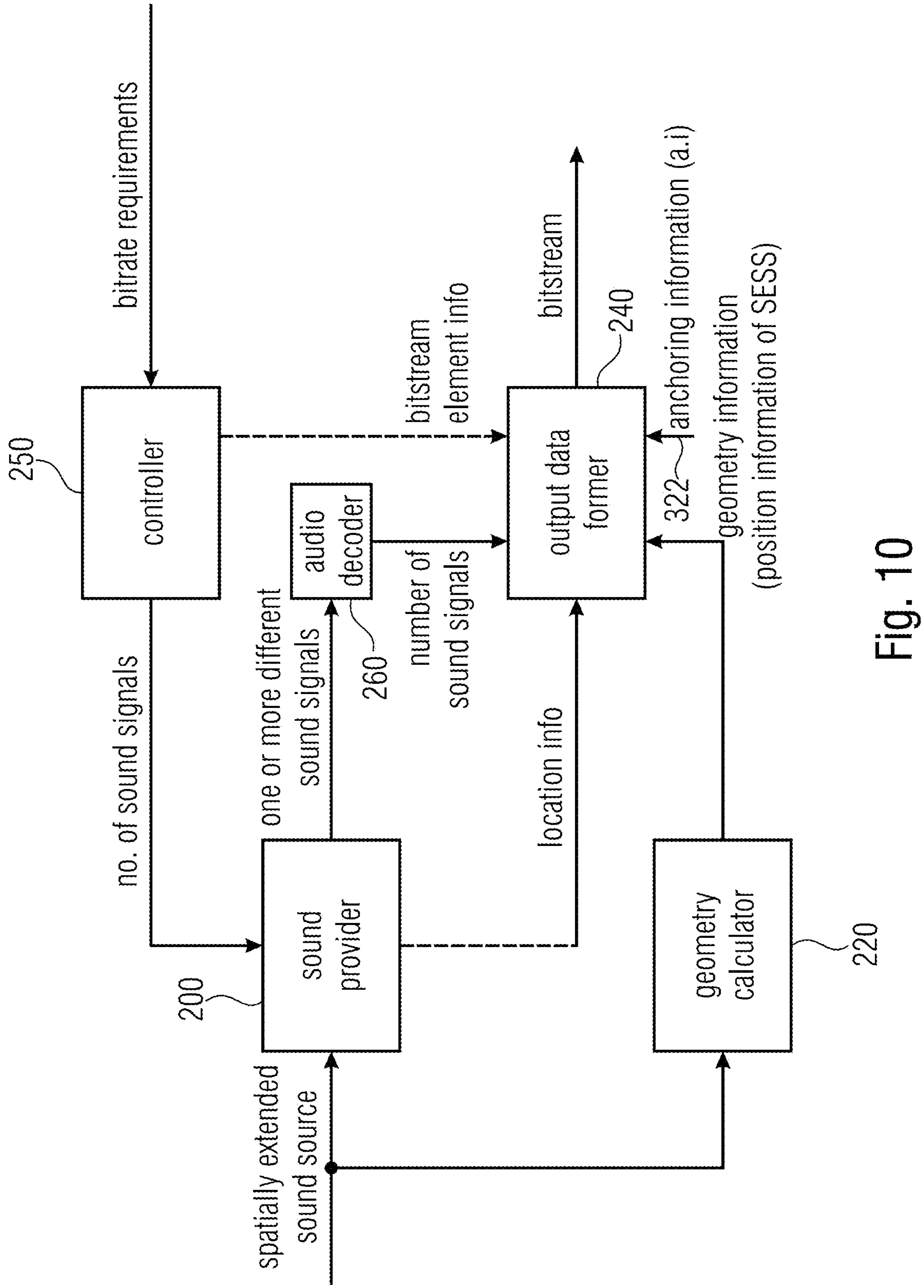
FIG. 10 illustrates an implementation of the apparatus or method for generating a description for a spatially extended sound source.

FIG. 10 illustrates the encoder-side of this scenario, when the reproduction is applied within an encoder/decoder application. FIG. 10 illustrates an apparatus for generating a description for a spatially extended sound source. Particularly, a sound provider 200 and an output data former 240 are provided. In this implementation, the spatially extended sound source is represented by a compressed description having one or more different sound signals, and the output data former generates the description representing the advantageously compressed sound scene, where the description comprises at least the one or more different sound signals and geometry information related to the spatially extended sound source. This represents the situation illustrated with respect to FIG. 9, where all the other information such as the position of the spatially extended sound source (see the dotted arrow in block 120 of FIG. 9) is freely selectable by a user on the reproduction side. Thus, a unique description of the spatially extended sound source with at least one or more different sound signals for this spatially extended sound source, where these sound signals are merely point source signals, is provided.

The apparatus for generating additionally comprises the geometry provider 220 for providing such as calculating information on the geometry for the spatially extended sound source. Other ways of providing the geometry information different from calculating comprise receiving a user input such as a figure manually drafted by the user or any other information provided by the user for example by speech, tones, gestures or any other user action. In addition to the one or more different sound signals, also the information on the geometry is introduced into the description or bitstream.

Optionally, the information on the individual location information for each sound signal of the one or more different sound signals is also introduced into the bitstream, and/or the position information for the spatially extended sound source is also introduced into the bitstream or description. The position information for the sound source can be separate from the geometry information or can be included in the geometry information. In the first case, the geometry information can be given relative to the position information. In the second case, the geometry information can comprise, for example for a sphere, the center point in coordinates and the radius or diameter. For a box-like spatially extended sound source, the eight or at least one of the corner points can be given in absolute coordinates.

The location information for each of the one or more different sound signals may be related to the geometry information of the spatially extended sound source. Alternatively, however, absolute location information related to the same coordinate system, in which the position or geometry information of the spatially extended sound source is given is also useful and, alternatively, the geometry information can also be given within an absolute coordinate system with absolute coordinates rather than in a relative way. However, providing this data in a relative way not related to a general coordinate system allows the user to position the spatially extended sound source in the reproduction setup herself or himself as indicated by the dotted line directed into the projector 120 of FIG. 9.

In a further embodiment, the sound provider 200 of FIG. 10 is configured for providing at least two different sound signals for the spatially extended sound source, and the output data former is configured for generating the bitstream so that the bitstream comprises the at least two different sound signals advantageously in an encoded format and optionally the individual location information for each sound signal of the at least two different sound signals either in absolute coordinates or with respect to the geometry of the spatially extended sound source.

Figure 1:
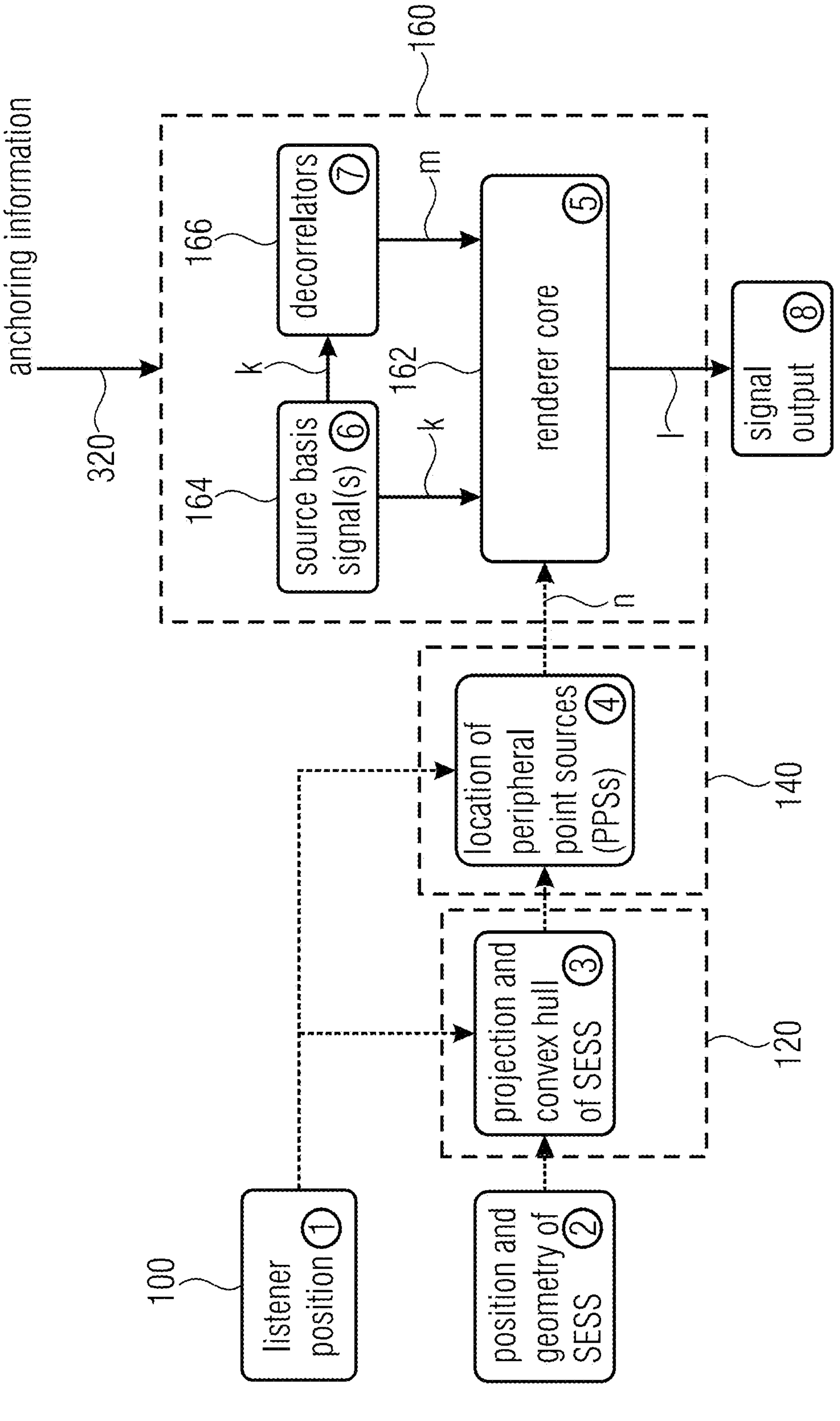
FIG. 1 is an overview of a block diagram of an embodiment of the reproduction side.

In an embodiment, the sound provider is configured to perform a recording of a natural sound source at the individual multiple microphone positions or orientations or to perform to derive a sound signal from a single basis signal or several basis signals by one or more decorrelation filters as, for example, discussed with respect to FIG. 1, item 164 and 166. The basis signals used in the generator can be the same or different from the basis signals provided on the reproduction site or transmitted from the generator to the reproducer.

In a further embodiment, the geometry provider 220 is configured to derive, from the geometry of the spatially extended sound source, a parametric description or a polygonal description, and the output data former is configured to introduce, into the bitstream, this parametric description or polygonal description.

Furthermore, the output data former is configured to introduce, into the bitstream or description, a description element, in an embodiment, wherein this bitstream element indicates a number of the at least one different sound signal for the spatially extended sound source included in the bitstream or included in an encoded audio signal associated with the bitstream, where the number is 1 or greater than 1. The bitstream generated by the output data former does not necessarily have to be a full description with audio waveform data on the one hand and metadata on the other hand. Instead, the description or bitstream can also only be a separate metadata bitstream comprising, for example, the description field for the number of sound signals for each spatially extended sound source, the geometry information for the spatially extended sound source and, in an embodiment, also the position information for the spatially extended sound source and optionally the location information for each sound signal and for each spatially extended sound source, the geometry information for the spatially extended sound source and, in an embodiment, also the position information for the spatially extended sound source. The waveform audio signals typically available in a compressed form are transmitted by a separate data stream or a separate transmission channel to the reproducer so that the reproducer receives, from one source, the encoded metadata and from a different source the (encoded) waveform signals.

The output data former (240) is furthermore configured to introduce, into the description, a flag, a bitstream or bitstream element or an information illustrated at 322 in FIG. 10, the information item indicating an absolute anchoring of the one or more different sound signals for the spatially extended sound source to a location or orientation of the spatially extended sound source. The anchoring information 322 can be generated automatically or manually by a creator of the sound scene or the spatially extended sound source. The individual channels can be actually recorded at certain places (such as in the example of the piano by means of a first microphone located to the left of the piano and a second microphone located to the right of the piano) or can be created synthetically or using virtual microphone. In the object anchoring mode, the positioning information of the sound signals or waveforms will be derived from the microphone positions or will be the microphone positions themselves.

Furthermore, an embodiment of the description generator comprises a controller 250. The controller 250 is configured to control the sound provider 200 with respect to the number of sound signals to be provided by the sound provider. In line with this procedure, the controller 250 also provides the bitstream element information to the output data former 240 indicated by the hatched line signifying an optional feature. The output data former introduces, into the bitstream element, the specific information on the number of sound signals as controlled controller 250 and provided by the sound provider 200. Advantageously, the number of sound signals is controlled so that the output bitstream comprising the encoded audio sound signals fulfills external bitrate requirements. When an allowed bitrate is high, the sound provider will provide more sound signals compared to a situation, when the bitrate allowed is small. In an extreme case, the sound provider will only provide the single sound signal for a spatially extended sound source when the bitrate requirements are tight.

The reproducer will read the correspondingly set bitstream element and will proceed, within the renderer 160, to synthesize, on the decoder-side and using the transmitted sounds signal, a corresponding number of further sound signals so that, in the end, a used number of peripheral point sources and, optionally, auxiliary sources have been generated.

When, however, the bitrate requirements are not so tight, the controller 250 will control the sound provider to provide a high number of different sound signals, for example, recorded by a corresponding number of microphones or microphone orientations. Then, on the reproduction side, any decorrelation processing is not necessary at all or is only necessary to a small degree so that, in the end, a better reproduction quality is obtained by the reproducer due to the reduced or not required decorrelation processing on the reproduction side. A trade-off between bitrate on the one hand and quality on the other hand may be obtained via the functionality of the bitstream element indicating the number of sounds signals per spatially extended sound source.

Figure 11:
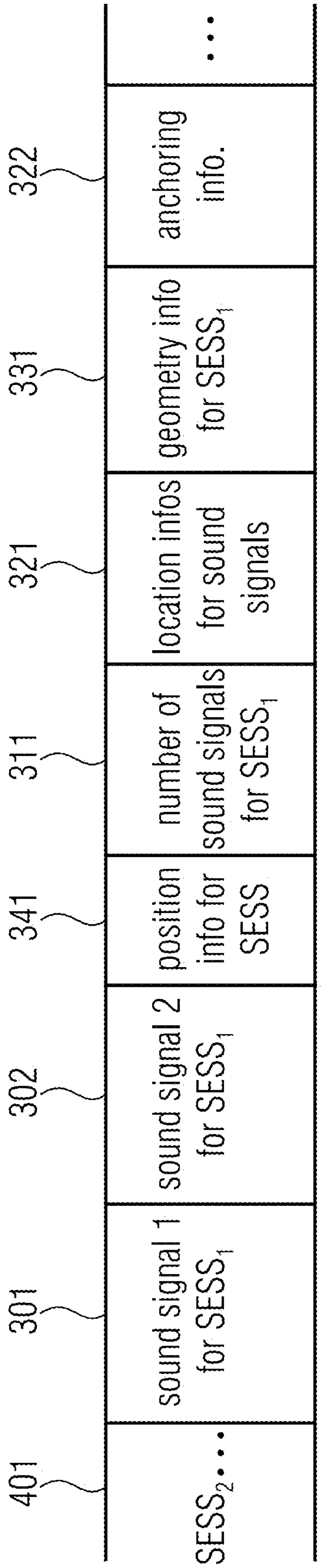
FIG. 11 illustrates an implementation of the description generated by the apparatus or method illustrated in FIG. 10.

FIG. 11 illustrates an embodiment of the description generated by the description generating apparatus illustrated in FIG. 10. The description comprises, for example, a second spatially extended sound source 401 indicated as $SESS_2$ with the corresponding data and another first spatially extended sound source indicated as $SESS_1$ with the data 301 to 322.

Hence, FIG. 11 illustrates detailed data for each spatially extended sound source in relation to the spatially extended sound source number 1. In the example in FIG. 11, two sound signals are there for the spatially extended sound source that have been generated in the generator from, for example, microphone output data picked up from microphones placed at two different places of a spatially extended sound source. The first sound signal is sound signal 1 indicated at 301 and the second sound signal is sound signal 2 indicated at 302, and both sound signals may be encoded via an audio encoder for bitrate compression. Furthermore, item 311 represents the description element indicating the number of sound signals for the spatially extended sound source 1 as, for example, controlled by the controller 250 of FIG. 10.

A geometry information for the spatially extended sound source is introduced as shown in block 331. Item 301 indicates the optional location information for the sound signals advantageously in relation to the geometry information such as, with respect to the piano example, indicating "close to the bass strings" for sound signal 1 and "close to the treble strings" for sound signal 2 indicated at 302. Hence, item 302 represents the positioning information. This positioning information is interpreted, when reproducing the sound source, by an anchoring information element 322. The geometry information may, for example, be a parametric representation or a polygonal representation of a piano model, and this piano model would be different for a grand piano or a (small) piano, for example. Item 341 additionally illustrates the optional data on the position information for the spatially extended sound source within the space. As stated, this position information 341 is not necessary, when the user provides the position information as indicated by the dotted line in FIG. 9 directed into the projector. However, even when the position information 341 is included in the bitstream, the user can nevertheless replace or modify the position information by means of a user interaction.

Subsequently, embodiments of the present invention are discussed. Embodiments relate to rendering of Spatially Extended Sound Sources in 6DoF VR/AR (virtual reality/augmented reality).

Embodiments of the invention are directed to a method, apparatus or computer program being designed to enhance the reproduction of Spatially Extended Sound Sources (SESS). In particular, the embodiments of the inventive method or apparatus consider the time-varying relative position between the spatially extended sound source and the virtual listener position. In other words, the embodiments of the inventive method or apparatus allow the auditory source width to match the spatial extent of the represented sound object at any relative position to the listener. As such, an embodiment of the inventive method or apparatus applies in particular to 6-degrees-of-freedom (6DoF) virtual, mixed and augmented reality applications where spatially extended sound source complements the traditionally employed point sources.

The embodiment of the inventive method or apparatus renders a spatially extended sound source by using several peripheral point sources which are fed with (advantageously significantly) decorrelated signals. In contrast to other methods, the locations of these peripheral point sources depend on the position of the listener relative to the spatially extended sound source. FIG. 1 depicts the overview block diagram of a spatially extended sound source renderer according to the embodiment of the inventive method or apparatus.

Key components of the block diagram are:

1. Listener position: This block provides the momentary position of the listener, as e.g., measured by a virtual reality tracking system. The block can be implemented as a detector 100 for detecting or an interface 100 for receiving the listener position.
2. Position and geometry of the spatially extended sound source: This block provides the position and geometry data of the spatially extended sound source to be rendered, e.g., as part of the virtual reality scene representation.
3. Projection and convex hull computation: This block 120 computes the convex hull of the spatially extended sound source geometry and then projects it in the direction towards the listener position (e.g., "image plane", see below). Alternatively, the same function can be achieved by first projecting the geometry towards the listener position and then computing its convex hull.
4. Location of peripheral point sources: This block 140 computes the locations of the used peripheral point sources from the convex hull projection data calculated by the previous block. In this computation, it may also consider the listener position and thus the proximity/distance of the listener (see below). The output are n peripheral point sources locations.
5. Renderer core: The renderer core 162 auralizes the n peripheral point sources by positioning them at the specified target locations. This can be e.g., binaural renderers using head related transfer functions or renderers for loudspeaker reproduction (e.g., vector based amplitude panning). The renderer core produces I loudspeaker or headphone output signals from k input audio basis signals (e.g., decorrelated signals of an instrument recording) and m (n-k) additional decorrelated audio signals.
6. Source Basis Signals: This block 164 is the input for k basis audio signals that are (sufficiently) decorrelated from each other and represent the sound source to be rendered (e.g., a mono—k=1—or a stereo—k=2—recording of a music instrument). The k basis audio signals are for example taken from the bitstream (see e.g., elements 301, 302 of FIG. 11) as received from a decoder side generator or can be provided at the reproduction site from an external source. The mapping of the basis audio signals to the locations of the peripheral sound sources or the generating or the waveforms for the peripheral sound sources can be influenced by positioning information together with anchoring information exemplarily indicating a user or listener anchoring or an object anchoring.
7. Decorrelators: This optional block 166 generates additional decorrelated audio signals, as needed for rendering n peripheral point sources.
8. Signal output: The renderer provides l output signals for loudspeaker (e.g., n=5.1) or binaural (typically n=2) rendering.

FIG. 1 illustrates an overview of the block diagram of an embodiment of the inventive method or apparatus. Dashed lines indicate the transmission of metadata such as geometry and positions. Solid lines indicate transmission of audio, where the k, l, and m indicate the multitude of the audio channels. The renderer core 162 receives possibly k+m audio signals and n (<=k+m) position data. Blocks 162, 164, 166 together form an embodiment of the general renderer 160. The renderer additionally receives anchoring information for interpreting geometry information and specifically the positioning information in case of several channel signals describing the spatially extended sound source.

The locations of the peripheral point sources depend on the geometry, in particular spatial extent, of the spatially extended sound source and the relative position of the listener with respect to the spatially extended sound source. In particular, the peripheral point sources may be located on the projection of the convex hull of the spatially extended sound source onto a projection plane. The projection plane may be either a picture plane, i.e., a plane perpendicular to the sightline from the listener to the spatially extended sound source or a spherical surface around the listener's head. The projection plane is located at an arbitrary small distance from the center of the listener's head. Alternatively, the projection convex hull of the spatially extended sound source may be computed from the azimuth and elevation angles which are a subset of the spherical coordinates relative from the listener head's perspective. In the illustrative examples below, the projection plane is of advantage due to its more intuitive character. In the implementation of the computation of the projected convex hull, the angular representation is of advantage due to simpler formalization and lower computational complexity. Please note that both the projection of the spatially extended sound source's convex hull is identical to the convex hull of the projected spatially extended sound source geometry, i.e., the convex hull computation and the projection onto a picture plane can be used in either order.

The peripheral point source locations may be distributed on the projection of the convex hull of the spatially extended sound source in various ways, including:

- They could be disturbed uniformly around the hull projection
- They could be distributed at extremal points of the hull projection
- They could be located at the horizontal and/or vertical extremal points of the hull projection (see figures in the Section Practical Examples).

In addition to peripheral point sources, also other auxiliary point sources may be used to produce an enhanced sense of acoustic filling at the expense of additional computational complexity. Further, the projected convex hull may be modified before positioning the peripheral point sources. For instance, the projected convex hull can be shrunk towards the center of gravity of the projected convex hull. Such a shrunk projected convex hull may account for the additional spatial spread of the individual peripheral point sources introduced by the rendering method. The modification of the convex hull may further differentiate between the scaling of the horizontal and vertical directions.

When the listener position relative to the spatially extended sound source changes, then the projection of the spatially extended sound source onto the projection plane changes accordingly. In turn, the locations of the peripheral point sources change accordingly. The peripheral point source locations shall be advantageously chosen such that they change smoothly for continuous movement of the spatially extended sound source and the listener. Further, the projected convex hull is changed when the geometry of the spatially extended sound source is changed. This includes rotation of the spatially extended sound source geometry in 3D space which alters the projected convex hull. Rotation of the geometry is equal to an angular displacement of the listener position relative to the spatially extended sound source and is such as referred to in an inclusive manner as the relative position of the listener and the spatially extended sound source. For instance, a circular motion of the listener around a spherical spatially extended sound source is represented by rotating the peripheral point sources around the center of gravity. Equally, rotation of the spatially extended sound source with a stationary listener results in the same change of the peripheral point source locations.

The spatial extent as it is generated by the embodiment of the inventive method or apparatus is inherently reproduced correctly for any distance between the spatially extended sound source and the listener. Naturally, when the user approaches the spatially extended sound source, the opening angle between the peripheral point source increases as it is appropriate for modeling physical reality.

Whereas the angular placement of the peripheral point sources is uniquely determined by the location on the projected convex hull on the projection plane, the distances of the peripheral point sources may be further chosen in various ways, including

- All peripheral point sources have the same distance equal to the distance of the entire spatially extended sound source, e.g., defined through the center of gravity of the spatially extended sound source relative to the head of the listener.
- The distance of each peripheral point source is determined by the back projection of the locations on projected convex hull onto the geometry of the spatially extended sound source such as the peripheral point sources projection onto the projection plane results in the same point. The back projection of the peripheral point sources from the projected convex hull onto the spatially extended sound source may not always be uniquely determined such that additional projection rules have to be applied (see Section Practical Examples).
- The distance of the peripheral point sources may not be determined at all if the rendering of the peripheral point sources does not require the distance property, but only the relative angular placement in azimuth and elevation.

To specify the geometric shape/convex hull of the spatially extended sound source, an approximation is used (and, possibly, transmitted to the renderer or renderer core) including a simplified 1D, e.g., line, curve; 2D, e.g., ellipse, rectangle, polygons; or 3D shape, e.g., ellipsoid, cuboid and polyhedra. The geometry of the spatially extended sound source or the corresponding approximate shape, respectively, may be described in various ways, including:

- Parametric description, i.e., a formalization of the geometry via a mathematical expression which accepts additional parameters. For instance, an ellipsoid shape in 3D may be described by an implicit function on the Cartesian coordinate system and the additional parameters are the extend of the principal axes in all three directions. Further parameters may include 3D rotation, deformation functions of the ellipsoid surface.
- Polygonal description, i.e., a collection of primitive geometric shapes such as lines, triangles, square, tetrahedron, and cuboids. The primate polygons and polyhedral may the concatenated to larger more complex geometries.

The peripheral point source signals are derived from the basis signals of the spatially extended sound source. The basis signals can be acquired in various ways such as: 1) Recording of a natural sound source at a single or multiple microphone positions and orientations (Example: recording of a piano sound as seen in the practical examples); 2) Synthesis of an artificial sound source (Example: sound synthesis with varying parameters); 3) Combination of any audio signals (Example: various mechanical sounds of a car such as engine, tires, door, etc.). Further, additional peripheral point source signals may be generated artificially from the basis signals by multiple decorrelation filters (see earlier section).

In certain application scenarios, the focus is on compact and interoperable storage/transmission of 6DoF VR/AR content. In this case, the entire chain consists of three steps:

1. Authoring/encoding of the desired spatially extended sound sources into a description such as a bitstream.
2. Transmission/storage of the generated bitstream. In accordance with the presented invention, the bitstream contains, besides other elements, the description of the spatially extended sound source geometries (parametric or polygons) and the associated source basis signal(s), such like a monophonic or a stereophonic piano recording. The waveforms may be compressed (see item 260 in FIG. 10) using perceptual audio coding algorithms, such as mp3 or MPEG-2/4 Advanced Audio Coding (AAC).

3. Decoding/rendering of the spatially extended sound sources based on the transmitted bitstream as described previously.

In addition to the core method described previously, several options for further processing exist:

Option 1—Dynamic Choice of Peripheral Point Source Number and Location

Depending on the distance of the listener to the spatially extended sound source, the number of peripheral point sources can be varied. As an example, when the spatially extended sound source and the listener are far away from each other, the opening angle (aperture) of the projected convex hull becomes small and thus fewer peripheral point sources can be chosen advantageously, thus saving on computational and memory complexity. In the extreme case, all peripheral point sources are reduced into a single remaining point source. Appropriate downmixing techniques may be applied to ensure that interference between the basis and derived signals does not degrade the audio quality of the resulting peripheral point source signals. Similar techniques may apply also in close distance of the spatially extended sound source to the listener position if the geometry of the spatially extended sound source is highly irregular depending on the relative viewpoint of the listener. For instance, a spatially extended sound source geometry which is a line of finite lengths may degenerate on the projection plane towards a single point. In general, if the angular extent of the peripheral point sources on the projected convex hull is low, the spatially extended sound source may be represented by fewer peripheral point sources. In the extreme case, all peripheral point sources are reduced into a single remaining point source.

Option 2—Spreading Compensation

Since each peripheral point source also exhibits a spatial spread toward the outside of the convex hull projection, the perceived auditory image width of the rendered spatially extended sound source is somewhat larger than the convex hull used for rendering. In order to align this with a desired target geometry, there are two possibilities:

1. Compensation during authoring: The additional spread of the rendering procedure is considered during content authoring. Specifically, a somewhat smaller spatially extended sound source geometry is chosen during content authoring such that the actually rendered size is as desired. This can be checked by monitoring the effect of the renderer or renderer core in the authoring environment (e.g., a production studio). In this case, the transmitted description or bitstream and renderer or renderer core use a reduced target geometry as compared to the target size.
2. Compensation during rendering: The spatially extended sound source renderer or renderer core can be made aware of the additional perceptual spread by the rendering procedure and thus can be enabled to compensate for this effect. As a simple example, the geometry used for rendering could be
   reduced by a constant factor a<1.0 (e.g., a=0.9), or
   reduced by a constant opening angle alpha=5 degrees
   before it is applied to place peripheral point sources. In this case, the transmitted bitstream contains the eventual target size of the spatially extended sound source geometry.

Also, a combination of these approaches is feasible.

Option 3—Generation of Peripheral Point Source Waveforms

Further, the actual signals for feeding the peripheral point sources can be generated from recorded audio signals by considering the user position relative to the spatially extended sound source in order to model spatially extended sound sources with geometry dependent sound contributions such as a piano with sounds of low notes on the left side and vice versa.

Example: The sound of an upright piano is characterized by its acoustic behavior. This is modeled by (at least) two audio basis signals, one near the lower end of the piano keyboard ("low notes") and one near the upper end of the keyboard ("high notes"). These basis signals can be obtained by appropriate microphone use when recording the piano sound and transmitted to the 6DoF renderer or renderer core, ensuring that there is sufficient decorrelation between them.

The peripheral point source signals are then derived from these basis signals by considering the position of the user relative to the spatially extended sound source:

- When the user faces the piano from the front (keyboard) side, the two peripheral point sources are wide apart from each other near the left and the right end of the piano keyboard, respectively. In this case, the basis signal for the low keys can be directly fed into the left peripheral point source and the basis signal for the high keys can be directly used to drive the right peripheral point source.
- As the listener walks around the piano by around 90 degrees to the right, the two peripheral point sources are panned very close to each other since the projection of the piano volume model (e.g., an ellipse) is small when looking at it from the side. If the basis signals would be continued to be used to directly drive the peripheral point source signals, one the peripheral point sources would contain predominantly high notes whereas the other one would carry mostly low notes. As this is undesired from a physical point of view, rendering can be improved by rotating the two basis signals to form the peripheral point source signals by a Givens rotation by the same angle as the user movement relative to the piano center of gravity. In this way, both signals contain signals of similar spectral content while still being decorrelated (assuming that the basis signals have been decorrelated).

Option 4—Postprocessing of Rendered Spatially Extended Sound Source

The actual signals can be pre- or post-processed to account for position- and direction-dependent effect, e.g., directivity pattern of the spatially extended sound source. In other words, the whole sound emitted from the spatially extended sound source, as described previously, can be modified to exhibit, e.g., a direction-dependent sound radiation pattern. In the case of the piano signal, this could mean that the radiation towards the back of the piano has less high frequency content than to the front of it. Further, the pre- and post-processing of the peripheral point source signals may be adjusted individually for each of the peripheral point sources. For instance, the directivity pattern may be chosen differently for each of the peripheral point sources. In the given example of a spatially extended sound source representing a piano, the directivity patterns of the low and high key range may be similar as described above, however additional signals such as pedaling noises have a more omnidirectional directivity pattern.

Subsequently, several advantages of embodiments are summarized

Lower computational complexity compared to a full filling of the spatially extended sound source interior with point sources (e.g., as used in Advanced AudioBIFS)

Less potential for destructive interference between point source signals

Compact size of bitstream information (geometric shape approximations, one or more waveforms)

Enables use of legacy recordings (e.g., stereo recording of piano) that have been produced for music consumption for the purpose of VR/AR rendering Subsequently, various practical implementation examples are presented:

Spherical spatially extended sound source

Ellipsoid spatially extended sound source

Line spatially extended sound source

Cuboid spatially extended sound source

Distance-dependent peripheral point sources

Piano-shaped spatially extended sound source

As described in embodiments of the inventive method or apparatus above various methods for determining the location of the peripheral point sources may be applied. The following practical examples demonstrate some isolated methods in specific cases. In a complete implementation of the embodiment of the inventive method or apparatus, the various methods may be combined as appropriate considering computational complexity, application purpose, audio quality and ease of implementation.

The spatially extended sound source geometry is indicated as a surface mesh. Note that the mesh visualization does not imply that the spatially extended sound source geometry is described by a polygonal method as in fact the spatially extended sound source geometry might be generated from a parametric specification. The listener position is indicated by a blue triangle. In the following examples the picture plane is chosen as the projection plane and depicted as a transparent gray plane which indicates a finite subset of the projection plane. Projected geometry of the spatially extended sound source onto the projection plane is depicted with the same surface mesh. The peripheral point sources on the projected convex hull are depicted as crosses on the projection plane. The back projected peripheral point sources onto the spatially extended sound source geometry are depicted as dots. The corresponding peripheral point sources on the projected convex hull and the back projected peripheral point sources on the spatially extended sound source geometry are connected by lines to assist to identify the visual correspondence. The positions of all objects involved are depicted in a Cartesian coordinate system with units in meters. The choice of the depicted coordinate system does not imply that the computations involved are performed with Cartesian coordinates.

Figure 2:
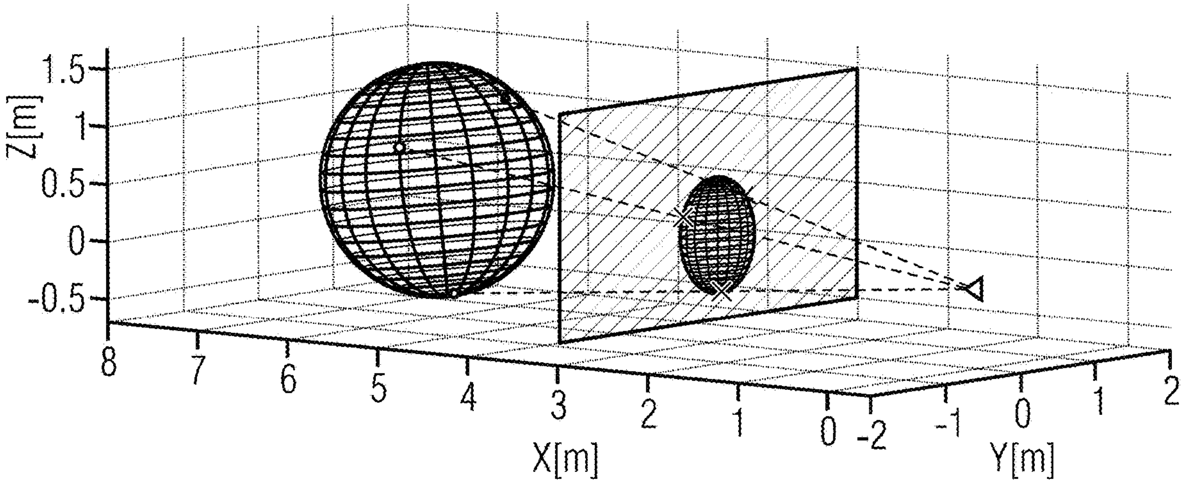
FIG. 2 illustrates a spherical spatially extended sound source with a different number of peripheral point sources.
Figure 2:
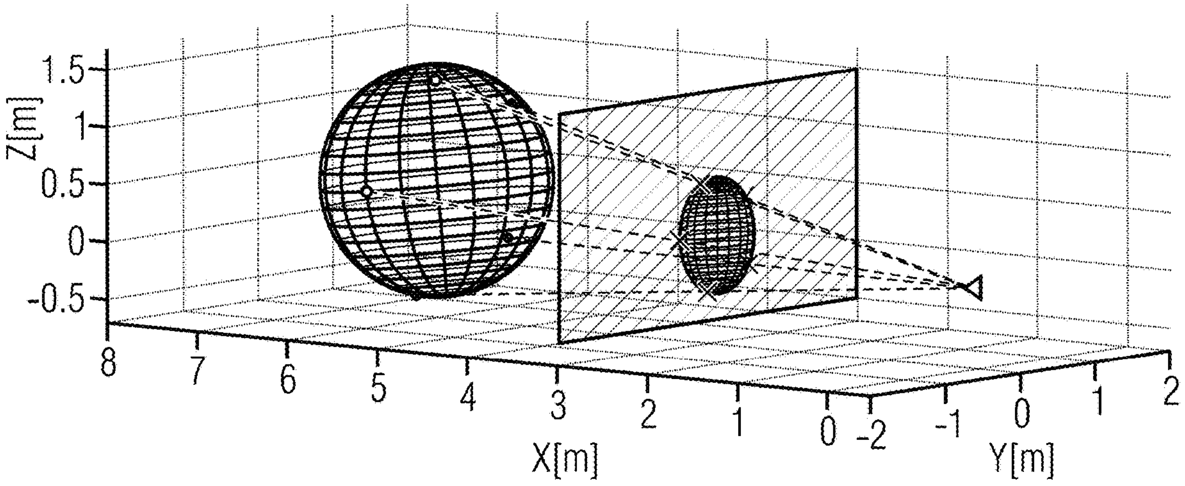
Figure 2:
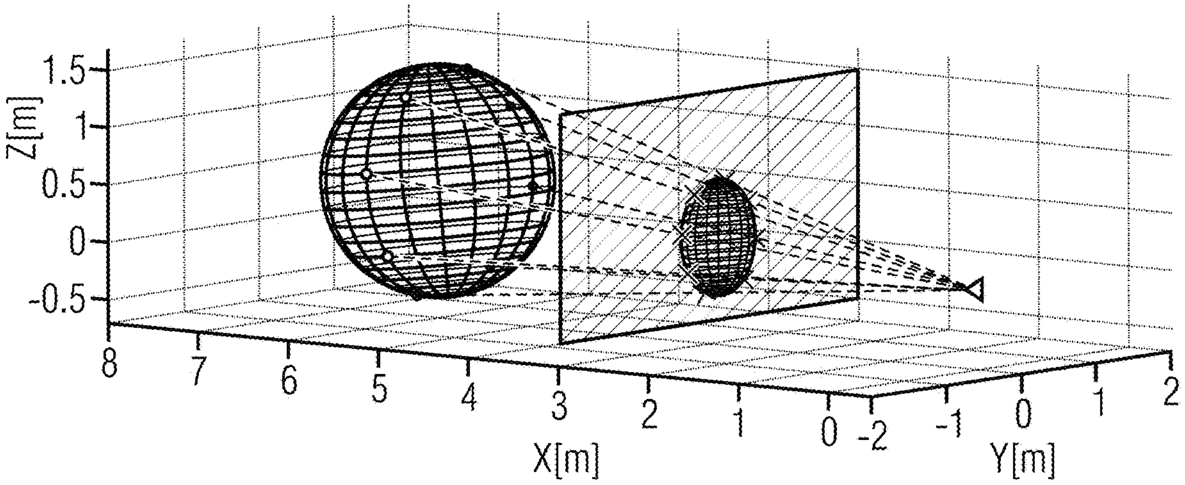

The first example in FIG. 2 considers a spherical spatially extended sound source. The spherical spatially extended sound source has a fixed size and fixed position relative to the listener. Three different set of three, five and eight peripheral point sources are chosen on the projected convex hull. All three sets of peripheral point sources are chosen with uniform distance on the convex hull curve. The offset positions of the peripheral point sources on the convex hull curve are deliberately chosen such that the horizontal extent of the spatially extended sound source geometry is well represented.

FIG. 2 illustrates spherical spatially extended sound source with different numbers (i.e., 3 (top), 5 (middle), and 8 (bottom)) of peripheral point sources uniformly distributed on the convex hull.

Figure 3:
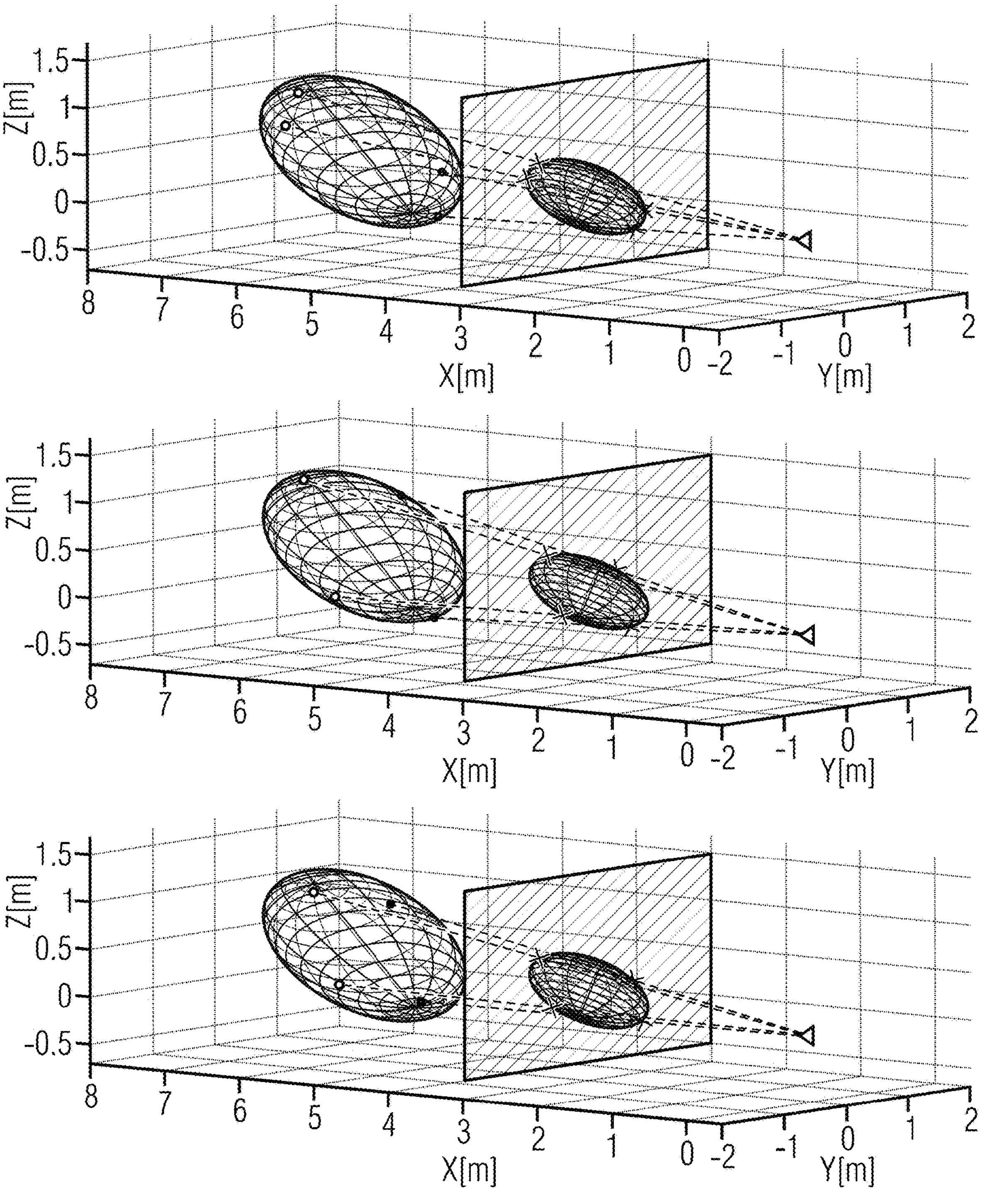
FIG. 3 illustrates an ellipsoid spatially extended sound source with several peripheral point sources.

The next example in FIG. 3 considers an ellipsoid spatially extended sound source.

Specifically, FIG. 3 illustrates an ellipsoid spatially extended sound source with four peripheral point sources under three different methods of determining the locations of the peripheral point sources. The top figure in FIG. 3 illustrates the peripheral sound sources at horizontal and vertical extremal points. The figure in the middle of FIG. 3 illustrates peripheral point sources at uniformly distributed points on the convex hull and the figure at the bottom shows peripheral point sources uniformly distributed on a shrunk convex hull.

The ellipsoid spatially extended sound source has a fixed shape, position and rotation in 3D space. Four peripheral point sources are chosen in this example. Three different methods of determining the location of the peripheral point sources are exemplified:

a) two peripheral point sources are placed at the two horizontal extremal points and two peripheral point sources are placed at the two vertical extremal points. Whereas, the extremal point positioning is simple and often appropriate. This example shows that this method might yield peripheral point source locations which are relatively close to each other.

b) All four peripheral point sources are distributed uniformly on the projected convex hull. The offset of the peripheral point sources location is chosen such that topmost peripheral point source location coincides with the topmost peripheral point source location in a). It can be seen that the choice of the peripheral point source location offset has a considerable influence on the representation of the geometric shape via the peripheral point sources.

c) All four peripheral point sources are distributed uniformly on a shrunk projected convex hull. The offset location of the peripheral point source locations is equal to the offset location chosen in b). The shrink operation of the projected convex hull is performed towards the center of gravity of the projected convex hull with a direction independent stretch factor.

Figure 4:
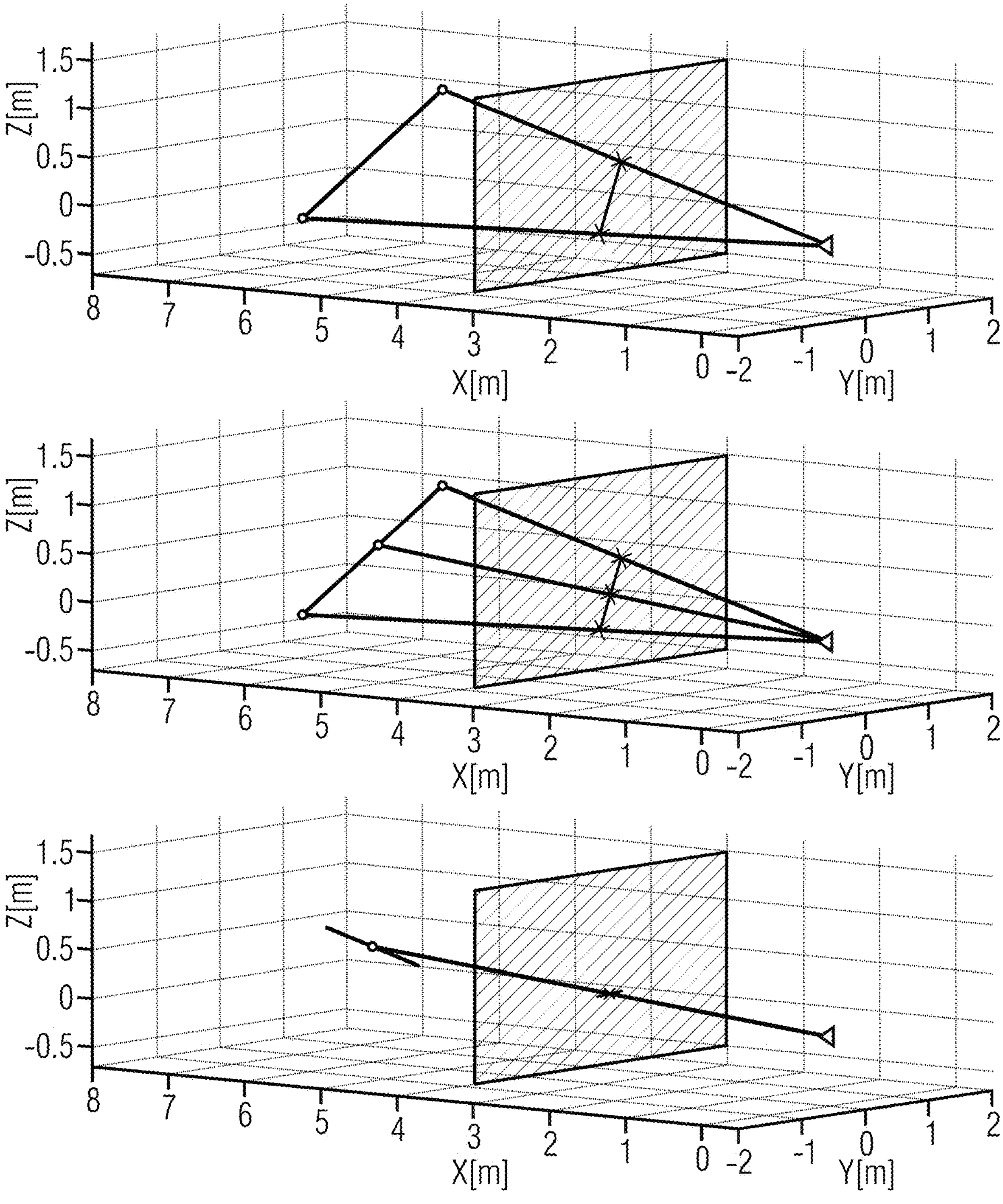
FIG. 4 illustrates a line spatially extended sound source with different methods to distribute the location of the peripheral point sources.

The next example in FIG. 4 considers a line spatially extended sound source. Whereas the previous examples considered volumetric spatially extended sound source geometry, this example demonstrates that the spatially extended sound source geometry may well be chosen as a single dimensional object within 3D space. Subfigure a) depicts two peripheral point sources placed on the extremal points of the finite line spatially extended sound source geometry. b) Two peripheral point sources are placed at the extremal points of the finite line spatially extended sound source geometry and one additional point source is placed in the middle of the line. As described in embodiments of the inventive method or apparatus, placing additional point sources within the spatially extended sound source geometry may help to fill large gaps in large spatially extended sound source geometries. c) The same line spatially extended sound source geometry as in a) and b) is considered, however the relative angle towards the listener altered such that projected length of the line geometry is considerably smaller. As described in embodiments of the inventive method or apparatus above, the reduced size of the projected convex hull may be represented by a reduced number of peripheral point sources, in this particular example, by a single peripheral point source located in the center of the line geometry.

Hence, FIG. 3 illustrates a line spatially extended sound source with three different methods to distribute the location of the peripheral point sources: a/top) the peripheral point sources are located at two extremal points on the projected convex hull; b/middle) the peripheral point sources are located at two extremal points on the projected convex hull with an additional point source in the center of the line; c/bottom)) one peripheral point source is located in the center of the convex hull as the projected convex hull of the rotated line is too small to allow more than one peripheral point source.

Figure 5:
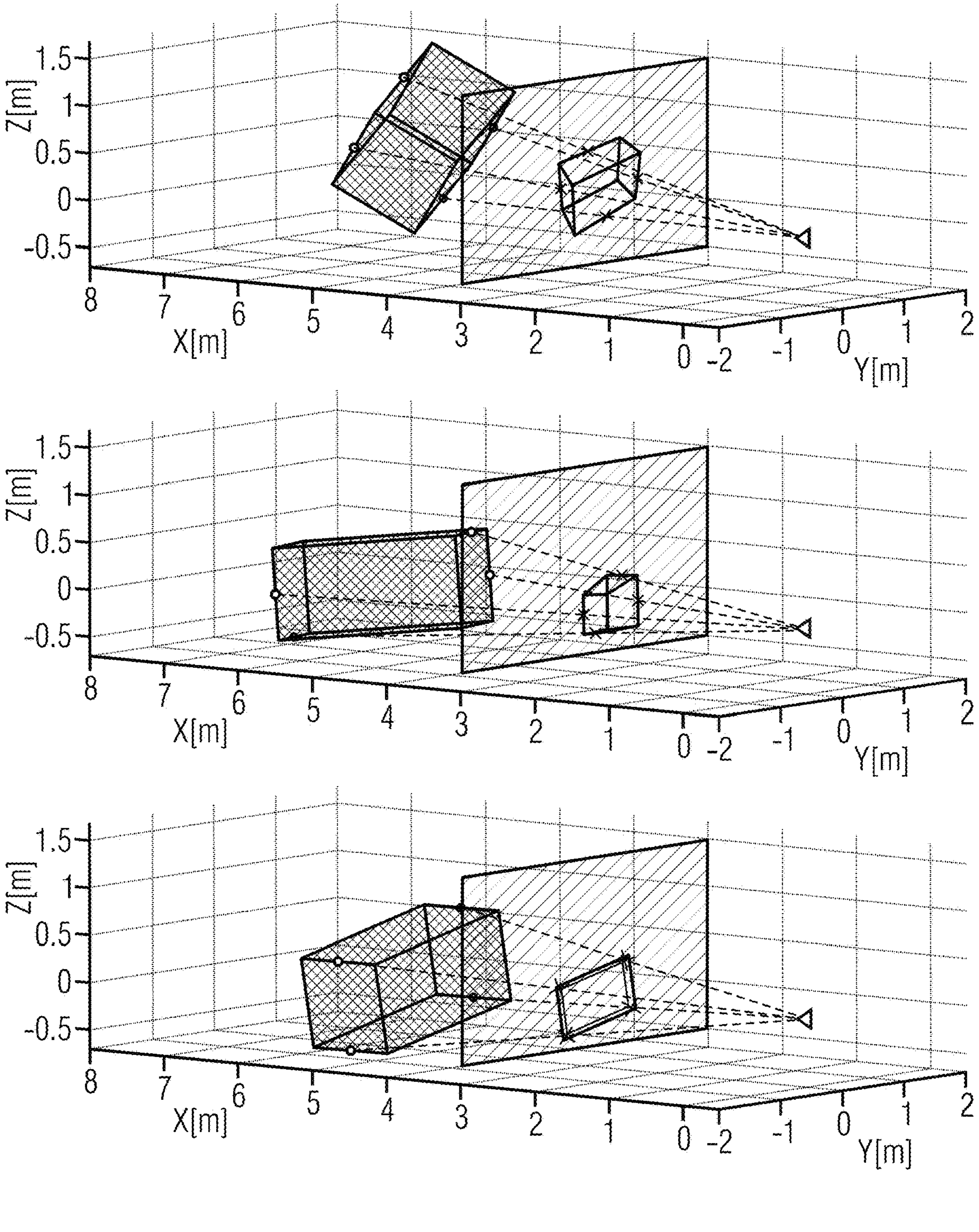
FIG. 5 illustrates a cuboid spatially extended sound source with different procedures to distribute the peripheral point sources.

The next example in FIG. 5 considers a cuboid spatially extended sound source. The cuboid spatially extended sound source has a fixed size and a fixed location, however the relative position of the listener changes. Subfigures a) and b) depict differing methods of placing four peripheral point sources on the projected convex hull. The back projected peripheral point source locations are uniquely determined by the choice on the projected convex hull. c) depicts four peripheral point sources which do not have well-separated back projection locations. Instead, the distances of the peripheral point source locations are chosen equal to the distance of the center of gravity of the spatially extended sound source geometry.

FIG. 4, therefore, illustrates a cuboid spatially extended sound source with three different methods to distribute the peripheral point sources: a/top) two peripheral point sources are located on the horizontal axis and two peripheral point sources are located on the vertical axis; b/middle) two peripheral point sources are located on the horizontal extremal points of the projected convex hull and two peripheral point sources are located on the vertical extremal points of the projected convex hull; c/bottom) back projected peripheral point sources distances are chosen to be equal to the distance of the center of gravity of the spatially extended sound source geometry.

Figure 6:
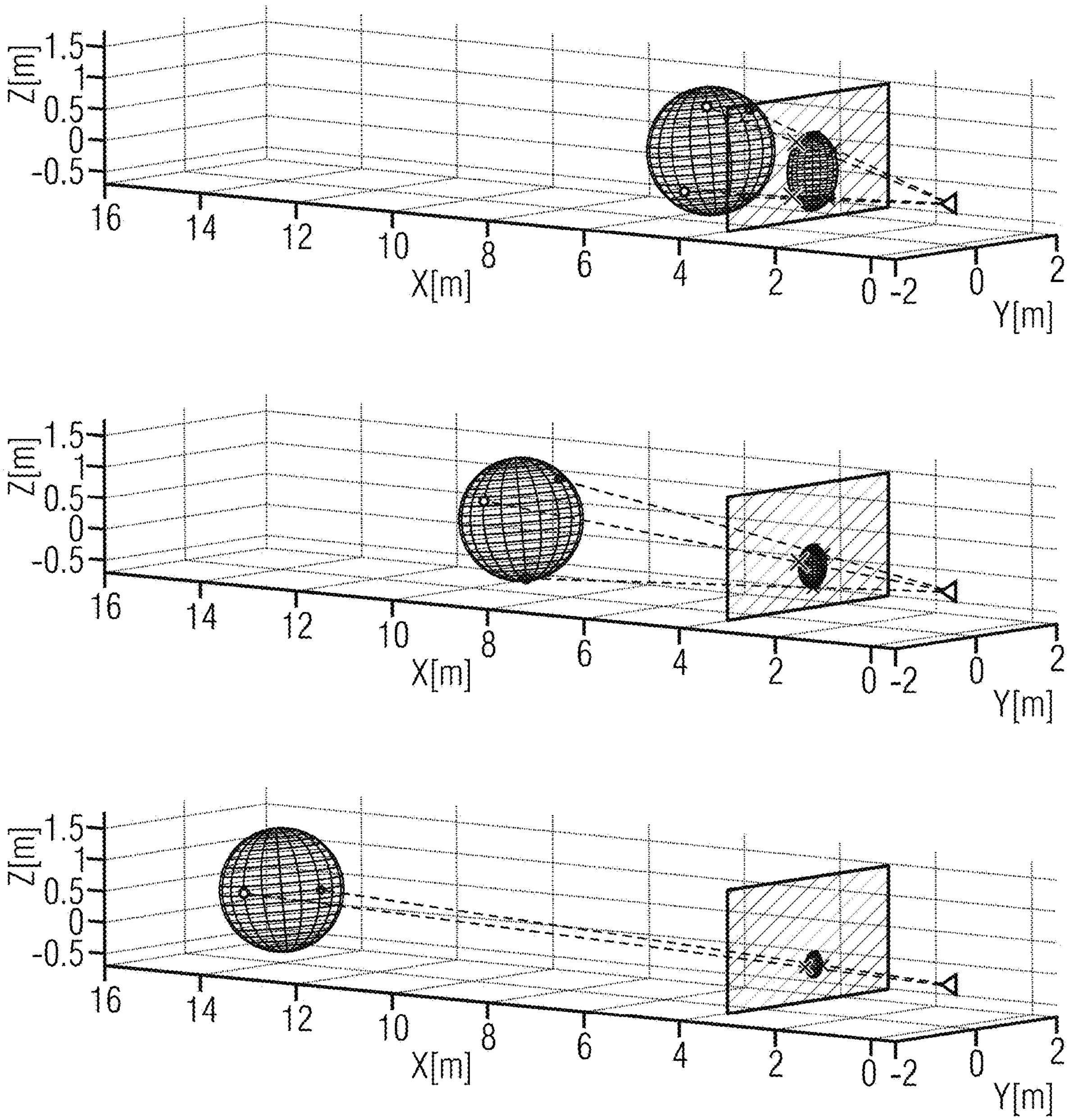
FIG. 6 illustrates a spherical spatially extended sound source at different distances.

The next example in FIG. 6 considers a spherical spatially extended sound source of fixed size and shape, but at three different distances relative to the listener position. The peripheral point sources are distributed uniformly on the convex hull curve. The number of peripheral point sources is dynamically determined from the length of the convex hull curve and the minimum distance between the possible peripheral point source locations. a) The spherical spatially extended sound source is at close distance such that four peripheral point sources are chosen on the projected convex hull. b) The spherical spatially extended sound source is at medium distance such that three peripheral point sources are chosen on the projected convex hull. a) The spherical spatially extended sound source is at far distance such that only two peripheral point sources are chosen on the projected convex hull. As described in embodiments of the inventive method or apparatus above, the number of peripheral point sources may also be determined from the extent represented in spherical angular coordinates.

Hence, FIG. 5 illustrates a spherical spatially extended sound source of equal size but at different distances: a/top) close distance with four peripheral point sources distributed uniformly on the projected convex hull; b/middle) middle distance with three peripheral point sources distributed uniformly on the projected convex hull; c/bottom) far distance with two peripheral point sources distributed uniformly on the projected convex hull.

Figure 7:
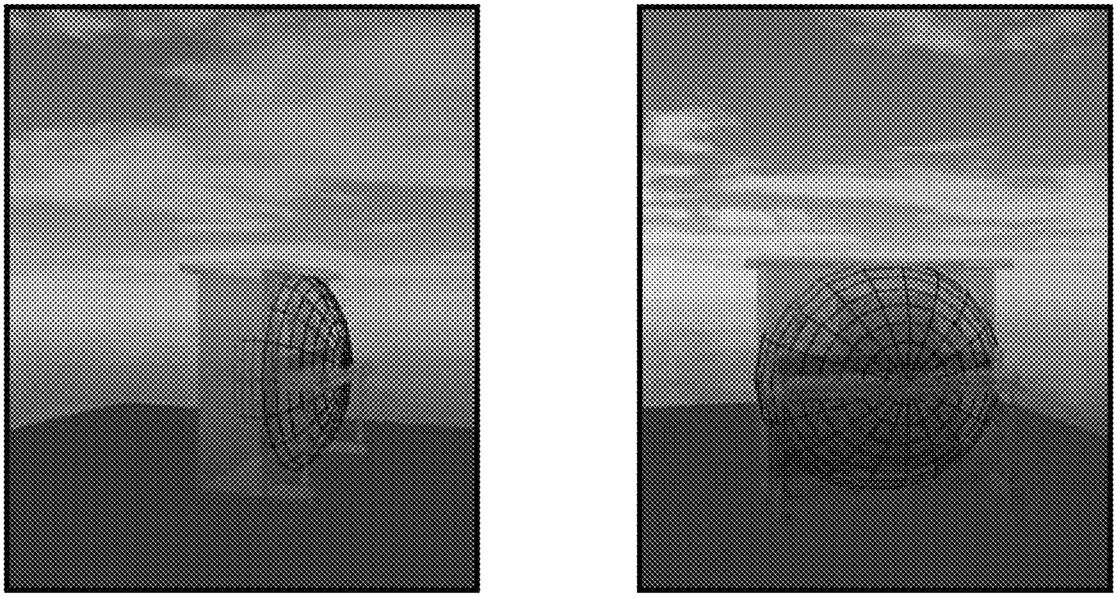
FIG. 7 illustrates a piano-shaped spatially extended sound source within approximatively parametric ellipsoid shape.
Figure 8:
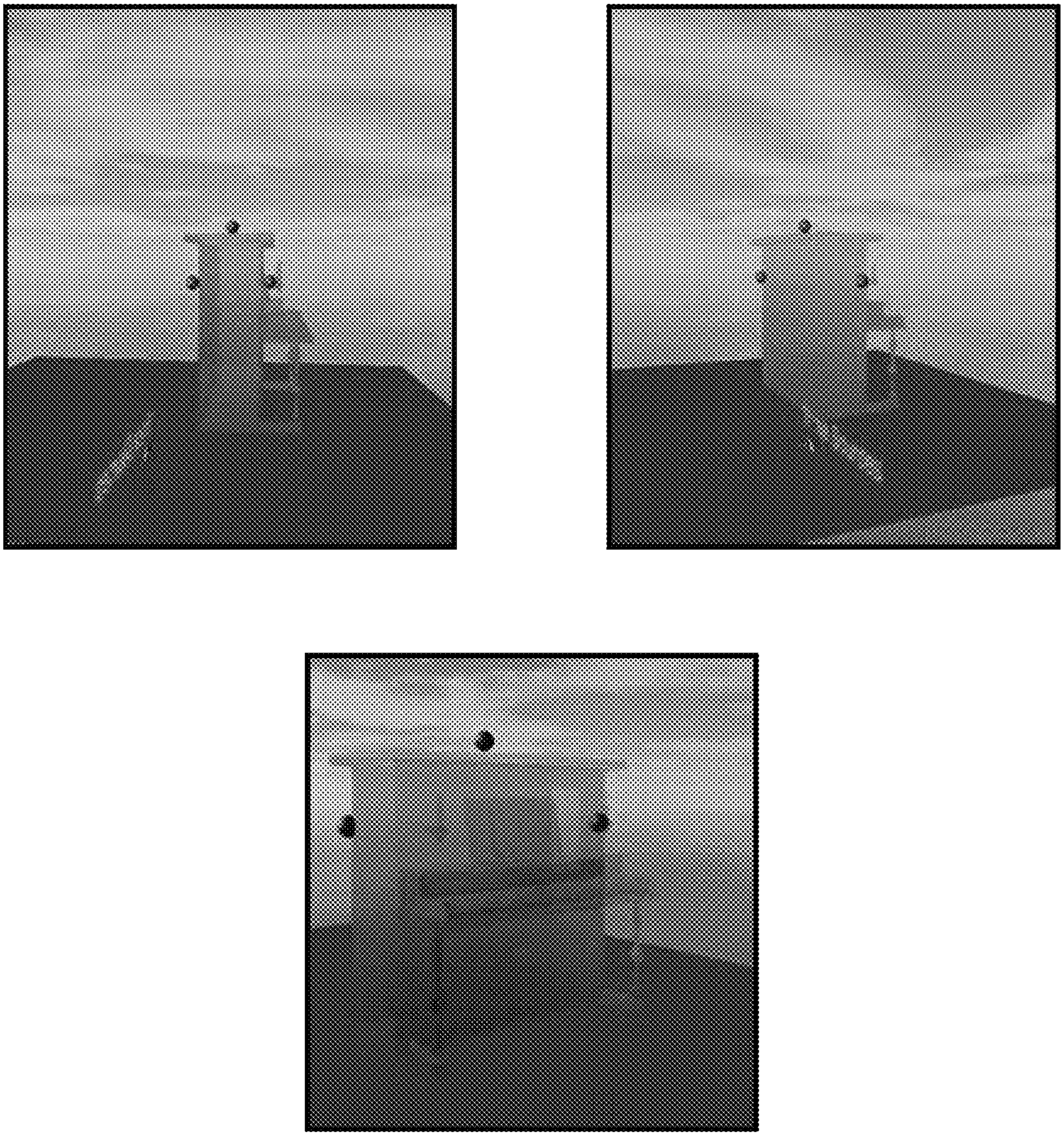
FIG. 8 illustrates a piano-shaped spatially extended sound source with three peripheral point sources distributed on extreme points of the projected convex hull.

The last example in FIGS. 7 and 8 considers a piano-shaped spatially extended sound source placed within a virtual world. The user wears a head-mounted display (HMD) and headphones. A virtual reality scene is presented to the user consisting of an open word canvas and a 3D upright piano model standing on the floor within the free movement area (see FIG. 7). The open world canvas is a spherical static image projected onto a sphere surrounding the user. In this particular case, the open world canvas depicts a blue sky with white clouds. The user is able to walk around and watch and listen to the piano from various angles. In this scene the piano is rendered as either a single point source placed in the center of gravity or as a spatially extended sound source with three peripheral point sources on the projected convex hull (see FIG. 8). Rendering experiments show the vastly superior realism of the peripheral point source rendering method over a rendering as a single point source.

To simplify the computation of the peripheral point source locations, the piano geometry is abstracted to an ellipsoid shape with similar dimensions, see FIG. 7. Further, two substitute point sources are placed on left and right extremal points on the equatorial line, whereas the third substitute point remains at the north pole, see FIG. 8. This arrangement guarantees the appropriate horizontal source width from all angles at a highly reduced computational cost.

In other words, FIG. 6 illustrates a piano-shaped spatially extended sound source with an approximate parametric ellipsoid shape (indicated as a mesh).

FIG. 7 illustrates a piano-shaped spatially extended sound source with three peripheral point sources distributed on the vertical extremal points of the projected convex hull and the vertical top position of the projected convex hull. Note that for better visualization, the peripheral point sources are placed on a stretched projected convex hull.

Subsequently, specific features of embodiments of the invention are provided. The characteristics of the presented embodiments are the following:

- To fill the perceived acoustic space of the spatially extended sound source, advantageously not its entire interior is filled with decorrelated point sources (peripheral point sources), but only its periphery as it is facing the listener (e.g., “the projection of the spatially extended sound source’s convex hull towards the listener”). Specifically, this means that the peripheral point source locations are not attached to the spatially extended sound source geometry but are computed dynamically taking into account the relative position of the spatially extended sound source with respect to the listener position.
  - Dynamic computation of peripheral point sources (number and location)
- An approximation of the spatially extended sound source shape is used (for a scenario using a compressed representation: transmitted as part of the bitstream).

The application of the described technology may be as a part of an Audio 6DoF VR/AR standard. In this context, one has the classic encoding/bitstream/decoder(+renderer) scenario:

- In the encoder, the shape of the spatially extended sound source would be encoded as side information together with the ‘basis’ waveforms of the spatially extended sound source which may be either
  - a mono signal, or
  - a stereo signal (advantageously sufficiently decorrelated), or even more recorded signals (also advantageously sufficiently decorrelated) characterizing the spatially extended sound source. These waveforms could be low bitrate coded.

In the decoder/renderer, the spatially extended sound source shape and the corresponding waveforms are retrieved from the bitstream and used for rendering the spatially extended sound source as described previously.

Depending on the used embodiments and as alternatives to the described embodiments, it is to be noted that the interface can be implemented as an actual tracker or detector for detecting a listener position. However, the listening position will typically be received from an external tracker device and fed into the reproduction apparatus via the interface. However, the interface can represent just a data input for output data from an external tracker or can also represent the tracker itself.

Furthermore, as outlined, additional auxiliary audio sources between the peripheral sound source may be entailed.

Furthermore, it has been found that left/right peripheral sources and optionally horizontally (with respect to the listener) spaced auxiliary sources are more important for the perceptual impression than vertically spaced peripheral sound sources, i.e., peripheral sound source on top and at the bottom of the spatially extended sound source. When, for example, resources are scarce, it is of advantage to use at least horizontally spaced peripheral (and optionally auxiliary) sound sources while vertically spaced peripheral sound sources can be omitted in the interest of saving processing resources.

Furthermore, as outlined, the bitstream generator can be implemented to generate a bitstream with only one sound signal for the spatially extended sound source, and, the remaining sound signals are generated on the decoder-side or reproduction side by means of decorrelation. When only a single signal exists, and when the whole space is to be filled up equally with this single signal, any location information is not necessary. However, it can be useful to have, in such a situation, at least additional information on a geometry of the spatially extended sound source calculated by a geometry information calculator such as the one illustrated at 220 in FIG. 10.

Further embodiments are discussed below:

ObjectSourceInputLayout

An ObjectSource with spatial extent can have a multichannel AudioStream to give the renderer the possibility to render the ObjectSource with greater realism than what is possible with a mono AudioStream. This can for example be useful when rendering diffused audio sources such as fountains, waterfalls, rivers, breaking waves, etc.

Figure 12A:
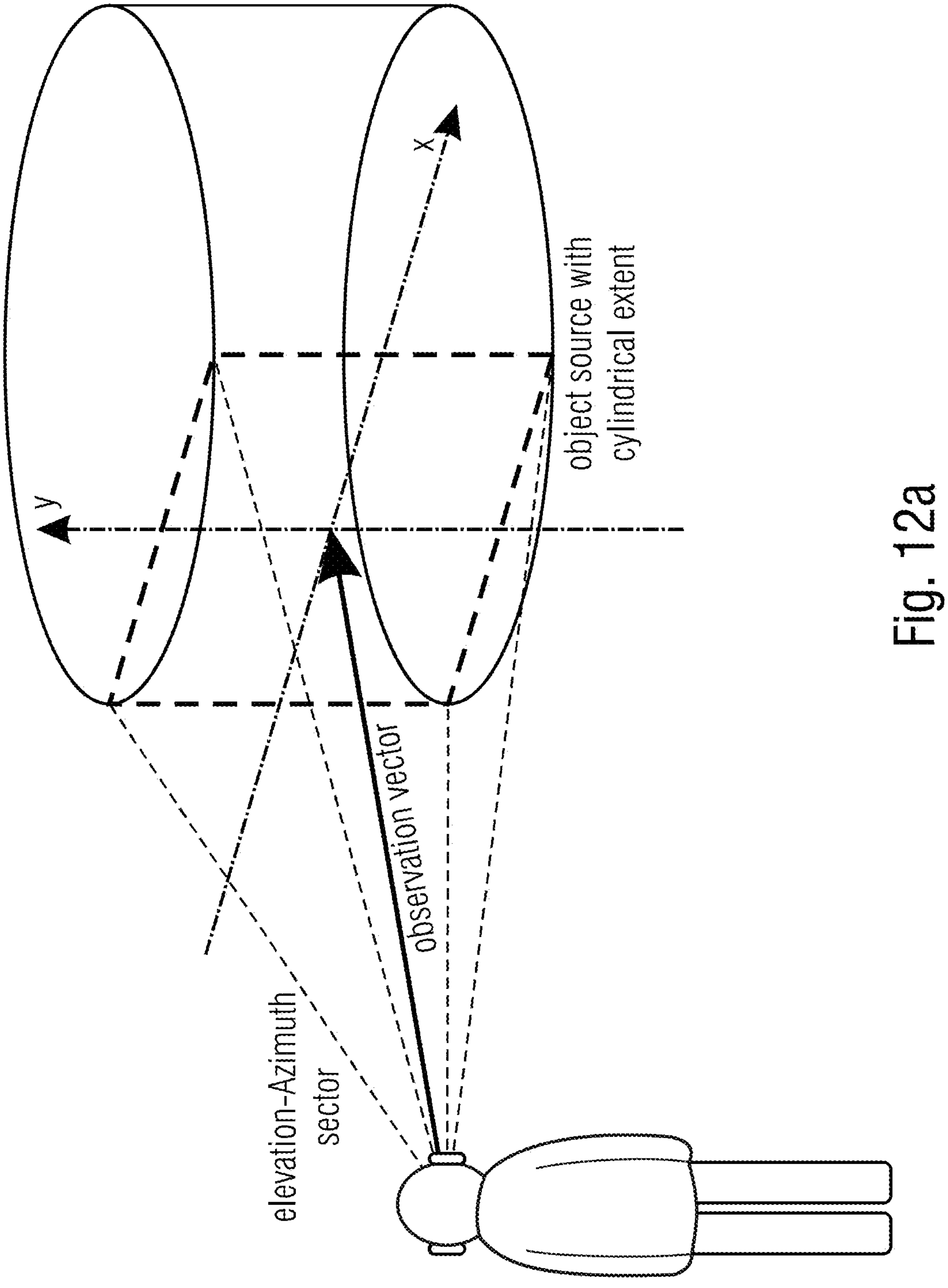
FIG. 12*a* illustrates an object source with cylindrical extent and "user" alignment observed in the front-right hemisphere of a listener.
Figure 12B:
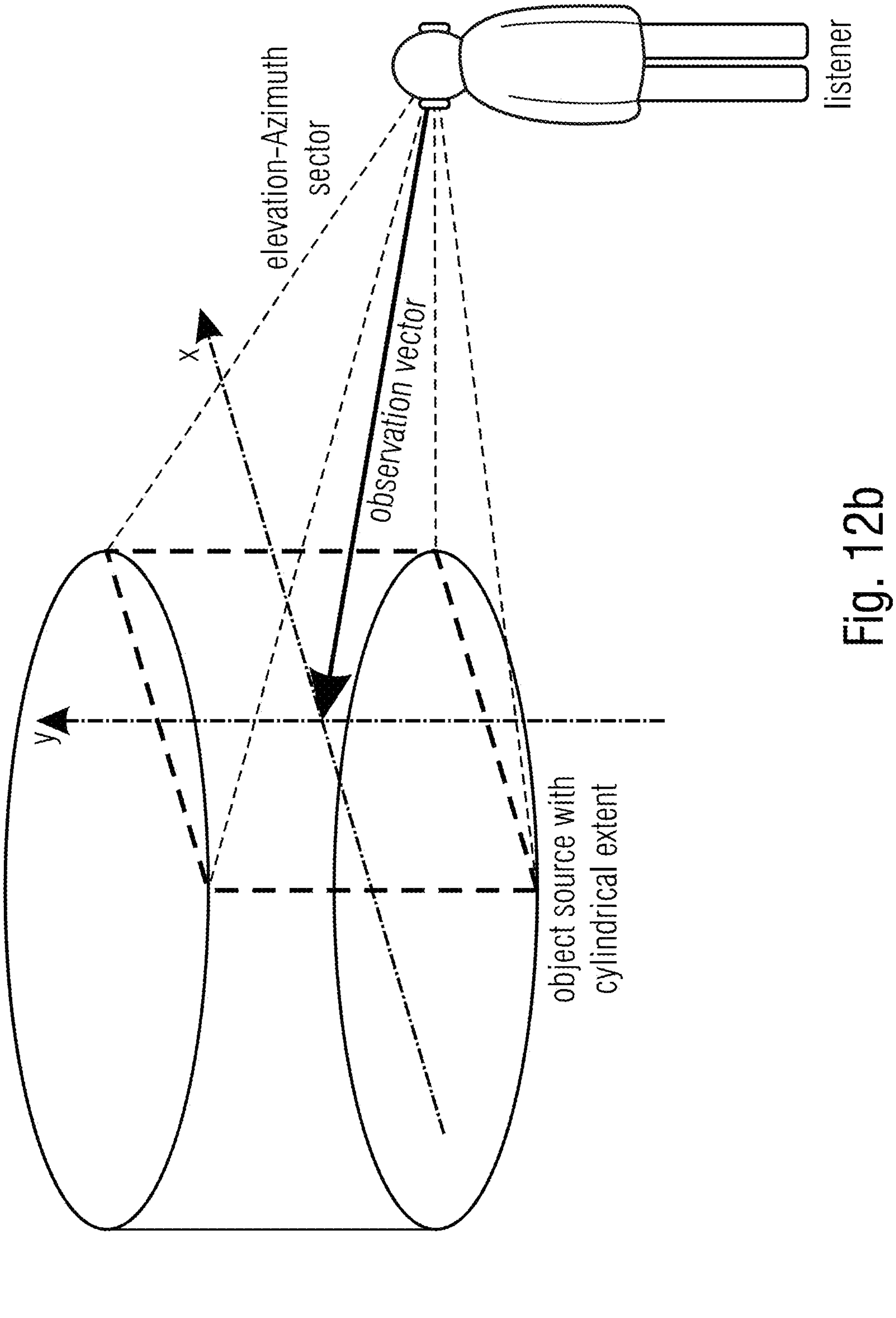
FIG. 12*b* illustrates an object Source with cylindrical extent and "user" alignment observed in the front-left hemisphere of a listener.

An ObjectSource with an extent is always perceived by the listener in an elevation-azimuth sector from the listener. This sector is determined by the relative position of the ObjectSource with respect to the listener and the extent of the ObjectSource, all in an acoustical perceptual sense. This is exemplified in FIG. 12*a* for an object source with a cylindrical extent where the ObjectSource is in the front-right hemisphere of the listener. The intersection of a plane that is orthogonal to the observation vector to the center of the elevation-azimuth sector and the elevation-azimuth sector specifies a rectangle. This rectangle represents the acoustically perceived horizontal and vertical extent of the ObjectSource by the listener from the position of the listener. As the listener moves around the ObjectSource, moves closer to it or further away from it, this rectangle will be translated, rotated and resized in the world space coordinate system. FIG. 12*b* illustrates this when the cylindrical ObjectSource is positioned in the front-left hemisphere of the listener. But in the x-y coordinate system that has the origin at the center of these perceived extent rectangles, these rectangles are always positioned with the center in the (0,0) point of the source.

An InputLayout child node of an ObjectSource description is composed of an alignment flag and a string, containing positioning mnemonics separated by whitespaces:

<InputLayout>
Inside of an <ObjectSource> node, it describes the positioning and handling of several associated waveforms.

| Attribute | Type | Flags | Default | Description |
|---|---|---|---|---|
| alignment | String | R | | Indicates anchoring mode: “user” indicates that the labels are anchored by the user viewing direction “object” indicates that the labels are anchored by the position/orientation of the ObjectSource element |
| positioning | String | R | | Indicates intended spatial assignment of wave-forms |

The alignment attribute defines the way how the waveforms (channels) of the associated audio stream are located/anchored with respect to the source. The positioning attribute is a string, containing mnemonic labels separated by whitespaces where for each waveform a mnemonic label has to be supplied. Nine relative position mnemonics referring to the previously described x-y coordinate system are supported as described in FIG. 13.

Figures 13, 14A:
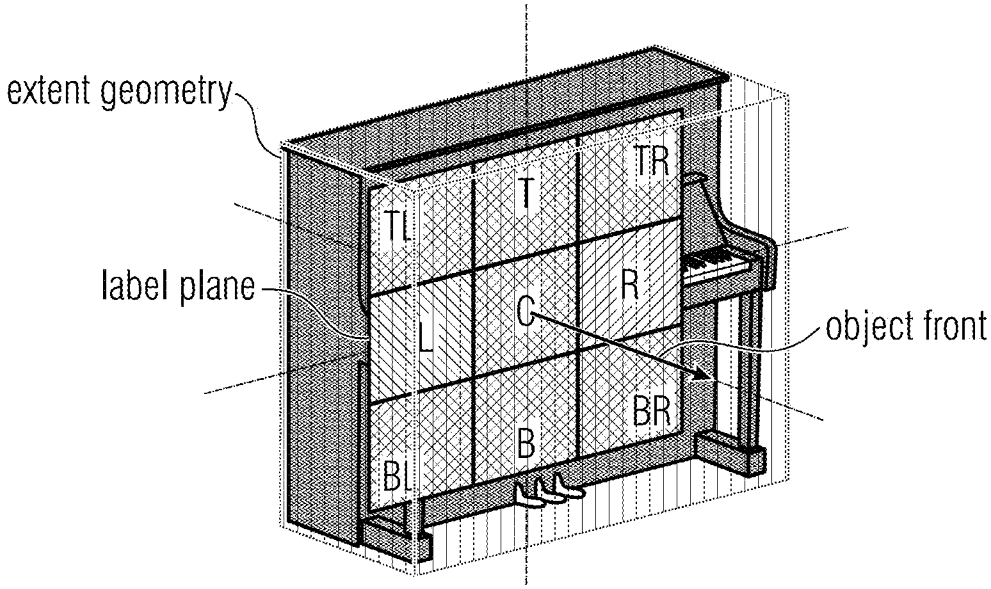
FIG. 13 illustrates relative signal channel positions.
FIG. 14*a* illustrates an object source (piano) with box-shaped extent and "object" alignment, i.e., a piano with orientation (front), extent geometry and label plane.

Thus, the channel specifications supported are nine relative positions in that x-y coordinate system as described in FIG. 13.

Furthermore, an ObjectSourceInputLayout can be a string, containing position mnemonics separated by whitespaces. The possible nine positions are listed in FIG. 13.

Alternatively, the relative channel positions can be used to indicate the usage of the waveforms for rendering an ObjectSource with size in absolute 3D coordinate space (example: The sound of a Grand Piano with one channel predominantly containing lower notes, the other containing predominantly higher notes). In this case, the labels apply to a rectangle on a plane that is perpendicular to the front direction of the ObjectSource when looking towards the ObjectSource's position (and the ObjectSource's ‘orientation’ attribute must be present). This is indicated by a starting “A” mnemonic in the ObjectSourceInputLayout string.

EXAMPLES inputLayout=“L R”

indicates that 2 waveforms are used to render a horizontal width of a source.

inputLayout=“B T”

indicates that 2 waveforms are used to render vertical width of a source.

inputLayout="BL TL TR BR"

indicates that 4 waveforms are used to render both horizontal and vertical width of a source.

inputLayout="A L R"

indicates that 2 waveforms are used to render a horizontal width of a source with absolute left-right assignment.

In other words, the above embodiment relates to an objectSource with two associated waveforms (from a stereo recording where the left channel ideally carries more the low notes and the right channel the higher notes).

To accommodate this, reference is made to the ObjectSourceInputLayout. The currently defined labels (like L, C, R) are always defined for a projection plane that is perpendicular to the view direction. So, this does not fit to the needs of a static object such as a (Grand) Piano.

Thus, in accordance with an embodiment, an additional bitstream element implemented for example as a little flag or an additional flag (or letter) in an EIF specification that allows *absolute* label anchoring to be added to the current EIF spec is used. This allows to address the Grand Piano case and describe the intended waveform use *relative to the fixed (absolute) location and orientation of the instrument*—together with the use of a size attribute. The orientation of the object would be the reference for the new projection plane. The additional bitstream element can also be different from the additional letter as long as a decoder is configured to parse the element for a correct rendering.

In the above example, the letter "A" indicates the flag or bitstream element or information on the anchoring. This information is used by the renderer on the reproduction side for rendering the at least two sound sources relative to a fixed location and/or orientation of the spatially extended sound source in response to a specific information received. Advantageously, when the information is not in the encoded signal syntax, then the rendering takes place in line with the transmitted information (e.g., left or right) but relative to the user position. When the information, however, is present, then the rendering is performed not relative to the user or listener position but relative to the sound source position. In other words, when the information is present, then the e.g., piano is rendered as it stands irrespective of whether the user stands before or behind the piano. The first channel always comes from the lower tone side of the piano and the second channel always comes from the upper tone side of the piano. When, however, this information is not there, then the channel position would only be correct when the user stands in front of the piano, but would be wrong when the user stands behind the piano.

Figure 14B:
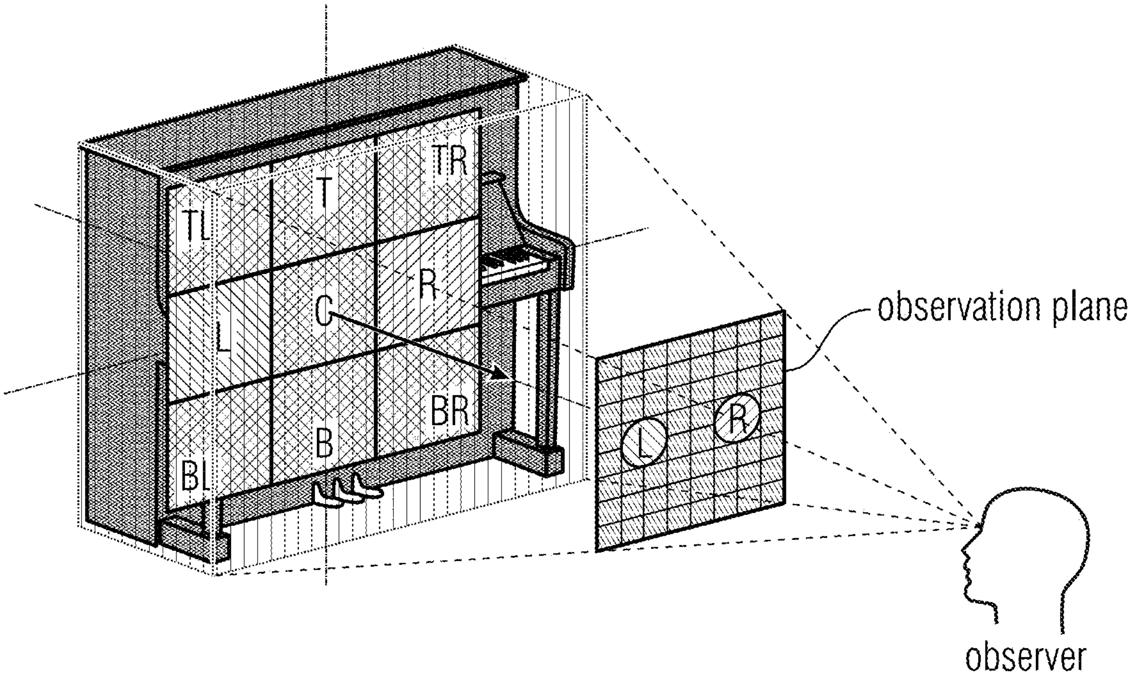
FIG. 14*b* illustrates the object source (piano) with box-shaped extent and "object" alignment observed from the front of the piano.
Figure 14C:
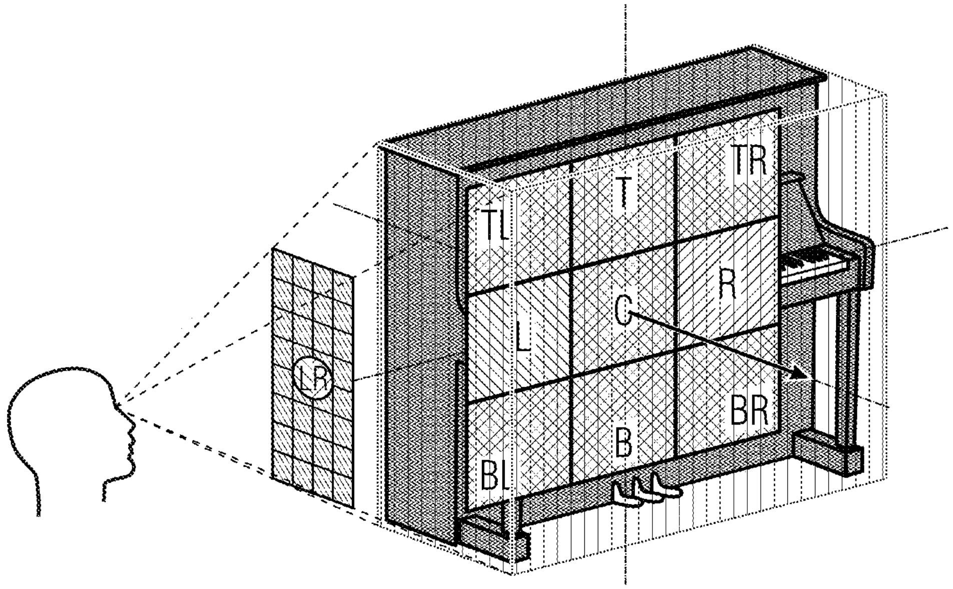
FIG. 14*c* illustrates the object source (piano) with box-shaped extent and "object" alignment observed from the side of the piano.

In other words, an embodiment relates to the anchoring of the labels relative to the listener viewing direction (as described in the initial example in FIGS. 12*a* and 12*b* with attribute alignment="user"), the signal channel relative position labels can be used to indicate the usage of the waveforms for rendering an ObjectSource with size such that it is anchored to certain object in the scene (attribute alignment="object"). An example is the sound of a Piano with one signal channel predominantly containing lower notes, the other containing predominantly higher notes. In this case, the position labels apply to a rectangle on a plane through the object position (center) that is perpendicular to the orientation of the ObjectSource when looking at its front (the ObjectSource's 'orientation' attribute must be present). During rendering, the positions indicated by the labels are then projected to the user observation plane (plane that is orthogonal to the observation vector), as shown in FIGS. 14*a* to 14*c*. This may also imply putting the sources (potentially with extent) 'behind' each other (when looking at the Piano from the side, see FIG. 14*c*) or even swapping them (when looking at the Piano from the back).

Hence, further examples are as follows:

<InputLayout alignment="user" positioning="L R"/> indicates that 2 waveforms are used to render a horizontal width of a source.

<InputLayout alignment="user" positioning="B T"/> indicates that 2 waveforms are used to render vertical width of a source.

<InputLayout alignment="user" positioning="BL TL TR BR" I> indicates that 4 waveforms are used to render both horizontal and vertical width of a source.

<ObjectSource id="src: piano"
position="1.2 1.0-0.3"
orientation="38 0 0"
extent="geo: piano_extent"
signal="signal: piano">
<InputLayout alignment="object" positioning="L R"/>
</ObjectSource> indicates that 2 waveforms are used to render left and right of a Piano object.

In the example illustrated in FIG. 14*a*, a certain "map" of channel positions, as illustrated in the table of FIG. 13, is given. In the example, the multichannel signal is a two channel signal having a left or first channel for the left part with the sound recorded or synthesized more from the lower notes or the left portion of the piano and a right or second channel with sound recorded or synthesized more from the higher notes of the right portion of the piano.

In the embodiment of FIG. 14*b*, the sound position calculator 140 of FIG. 1 or FIG. 9 calculates the positions of the peripheral sound sources, e.g., the four corners of the piano, using the projection plane depending on the listening position, i.e., the observer, as illustrated in FIG. 14*b*. Alternatively, the sound position calculator only calculates a left position e.g., in the middle of the left side of the piano rectangle and a right position in the middle of the right side of the piano rectangle.

For rendering, the renderer 160 uses, depending on the anchoring mode and the positioning information, the first channel for the single peripheral sound source on the left side in FIG. 14*b* or for both upper and lower positions on the left side. Furthermore, the renderer 160 uses, depending on the anchoring mode and the positioning information, the second channel for the single peripheral sound source on the right side in FIG. 14*b* or for both upper and lower positions on right side. This selection may, for example, be performed by block 164 of the renderer example of FIG. 1.

In a situation different from FIG. 14*b*, where the observer is positioned behind the piano at the same angle and distance as in FIG. 14*b*, the sound position calculator 140 of FIG. 1 or FIG. 9 calculates, using the projection plane depending on the listening position, i.e., the observer, the positions of the peripheral sound sources, e.g., the four back corners of the piano related to FIG. 14*b* or only a left position e.g. in the middle of the left side of the piano rectangle and a right position in the middle of the right side of the piano rectangle.

Now, in contrast to the preceding situation, the renderer 160 uses, depending on the anchoring mode and the positioning information, the first channel for the single peripheral sound source on the right side in FIG. 14*b* or for both upper and lower positions on the right side (in contrast to the left side as outlined above). Furthermore, the renderer 160 uses, depending on the anchoring mode and the positioning information, the second channel for the single peripheral sound source on the left side in FIG. 14*b* or for both upper and lower positions on left side (in contrast to the right side as outlined above). This selection may, for example, be performed by block 164 of the renderer example of FIG. 1.

A specific situation is illustrated in FIG. 14*b*. where the user stands on the side of the piano. In this embodiment, the waveform used for all peripheral sound sources may be the same one, and this waveform is calculated by adding the left or first channel and the right or second channel. This adding may comprise a weighted addition, so that in the embodiment in FIG. 14*c*, where the user is standing more on the left side of the piano the weighting factor for the left channel is greater than the weighting factor of the right channel, since the right channel will be somewhat lower due to a longer distance to the user compared to the left channel and e.g., due to an attenuation incurred by the object, i.e., the piano itself. This calculation from the transmitted channels may, for example, be performed by block 164 of the renderer example of FIG. 1.

In case the user is located on the right side of the piano, the situation is similar as outlined above, but with the weighting factors in case of a weighted addition exchanged. This calculation and the determination of the weighting factors may, for example, be performed by block 164 of the renderer example of FIG. 1.

It is noted that the piano is an example only. Arbitrary spatially extended sound sources can be represented by rectangular or any other such as ellipsoid-like boundaries or boxes as schematically illustrated in FIG. 14*a* to FIG. 14*c* using the exemplary convention of FIG. 13.

For comparison purposes not part of the invention, the mapping of the channels to the waveforms for the peripheral sound sources is considered for the user mode and the above examples. In FIG. 14*b*, the mapping would be the same as for the object mode, since left and right do not change, when the observer is standing in front of the object. However, in the example where the listener is located behind the object, the situation would be opposite, i.e., would be different for the user mode compared to the object mode. The same is true for the FIG. 14*c* embodiment. In case of the user mode instead of the object mode, any (e.g., weighted) addition would not occur, but the left channel would be used for the left peripheral sound source position and the right channel would be used for the right peripheral sound source position.

In case of a placement of the listener diagonal to the piano such as at a position "between" the placement in FIG. 14*b* and FIG. 14*c*, the waveforms for the sound sources can be calculated by a certain mixing of the left and right channels in case of the object anchoring mode. The waveform for the left peripheral sound source would be the first or left channel weighted by a greater weight added to the right or second channel weighted by a lower weight. The weights can be adjusted based on the observer angle with respect to the object so that a continuous change of weights from the case of FIG. 14*b* to the case of FIG. 14*c* (that typically has equal weights for both channels) will occur. This calculation and also the determination of the weights may, for example, be performed by block 164 of the renderer example of FIG. 1.

Furthermore, in case of having fewer channels than number of sound sources, additional sound sources can be generated by means of a decorrelator such as 166 in FIG. 9. In the embodiment of FIG. 14*c*, the added waveform derived from a sum of left and right can be decorrelated to obtain somewhat different waveforms for e.g., the four peripheral sound sources for the four corners of the projection plane in FIG. 14*c*.

In such an embodiment, the spatially extended sound source has associated therewith a multi-channel signal having a first channel and a second channel, the first channel being associated to a first portion of the spatially extended object and the second channel being associated to a second portion of the spatially extended object, wherein the first portion is different from the second portion, and wherein the specific information (320) indicates the rendering the at least two sound sources relative to a fixed location and/or orientation of the spatially extended sound source. Then, the renderer (160) is configured to determine the different sound signals for the different positions using a mapping of the first channel and the second channel to the different positions or using an addition of the first channel and the second channel to obtain the different sound signals for the different positions depending on the listener position and the first portion and the second portion of the spatially extended sound source.

In such an embodiment, the first portion is a left portion and the second portion is a right portion of the spatially extended sound source.

When the listener position is in front of the spatially extended sound source (FIG. 14*b*), the renderer is configured to use, for a sound source position to the left of the user, the first channel and for a position to the right of the user, the second channel.

Alternatively or additionally, when the listener position is behind of the spatially extended sound source (opposite to FIG. 14*b*), the renderer is configured to use, for a sound source position to the left of the user, the second channel and for a position to the right of the user, the first channel.

Alternatively or additionally, when the listener position is at a side of the spatially extended sound source (FIG. 14*c*), the renderer is configured to use, for a sound source position to the left of the user, an addition of the first channel and the second channel, and for a position to the right of the user, the addition of the first channel and the second channel.

Alternatively or additionally, when the listener position is at a side of the spatially extended sound source, the renderer is configured to use, for a sound source position to the left of the user, a weighted addition of the first channel and the second channel, and for a position to the right of the user, the weighted addition of the first channel and the second channel, wherein weighting factors for the weighted addition are determined such that a weighting factor for a channel associated to a portion of the spatially extended sound source being closer to the listener position is greater than a weighting factor for another channel associated to another portion of the spatially extended sound source being further away from the listener position (FIG. 14*b*, weight for L is greater than weight for R; opposite to FIG. 14*b*, weight for R is greater than weight for L).

Alternatively or additionally, when the listener position is obliquely with respect to the spatially extended sound source, the renderer is configured to use, for a sound source position to the left of the user, a first weighted addition of the first channel and the second channel, and for a position to the right of the user, a second weighted addition of the first channel and the second channel, wherein weighting factors for the weighted additions are determined such that a weighting factor for a channel associated to a portion of the spatially extended sound source being closer to sound source position is greater than a weighting factor for another channel associated to another portion of the spatially extended sound source being further away to the sound source position (position "between" FIG. 14*b* and FIG. 14*c*; for the left sound sources of the projection, weight for left channel is greater than weight for the right channel and for the right sound sources of the projection, weight for left channel is lower than weight for the right channel).

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded sound field description can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

BIBLIOGRAPHY

Alary, B., Politis, A., & Valimaki, V. (2017). Velvet Noise Decorrelator.

Baumgarte, F., & Faller, C. (2003). Binaural Cue Coding-Part I: Psychoacoustic Fundamentals and Design Principles. Speech and Audio Processing, IEEE Transactions on, 11(6), S. 509-519.

Blauert, J. (2001). Spatial hearing (3 Ausg.). Cambridge; Mass: MIT Press.

Faller, C., & Baumgarte, F. (2003). Binaural Cue Coding-Part II: Schemes and Applications. Speech and Audio Processing, IEEE Transactions on, 11(6), S. 520-531.

Kendall, G. S. (1995). The Decorrelation of Audio Signals and Its Impact on Spatial Imagery. Computer Music Journal, 19(4), S. p 71-87.

Lauridsen, H. (1954). Experiments Concerning Different Kinds of Room-Acoustics Recording. Ingenioren, 47.

Pihlajamäki, T., Santala, O., & Pulkki, V. (2014). Synthesis of Spatially Extended Virtual Source with Time-Frequency Decomposition of Mono Signals. Journal of the Audio Engineering Society, 62(7/8), S. 467-484.

Potard, G. (2003). A study on sound source apparent shape and wideness.

Potard, G., & Burnett, I. (2004). Decorrelation Techniques for the Rendering of Apparent Sound Source Width in 3D Audio Displays.

Pulkki, V. (1997). Virtual Sound Source Positioning Using Vector Base Amplitude Panning. Journal of the Audio Engineering Society, 45(6), S. 456-466.

Pulkki, V. (1999). Uniform spreading of amplitude panned virtual sources.

Pulkki, V. (2007). Spatial Sound Reproduction with Directional Audio Coding. J. Audio Eng. Soc, 55(6), S. 503-516.

Pulkki, V., Laitinen, M.-V., & Erkut, C. (2009). Efficient Spatial Sound Synthesis for Virtual Worlds.

Schlecht, S. J., Alary, B., Valimaki, V., & Habets, E. A. (2018). Optimized Velvet-Noise Decorrelator.

Schmele, T., & Sayin, U. (2018). Controlling the Apparent Source Size in Ambisonics Unisng Decorrelation Filters.

Schmidt, J., & Schröder, E. F. (2004). New and Advanced Features for Audio Presentation in the MPEG-4 Standard.

Verron, C., Aramaki, M., Kronland-Martinet, R., & Pallone, G. (2010). A 3-D Immersive Synthesizer for Environmental Sounds. Audio, Speech, and Language Processing, IEEE Transactions on, title=A Backward-Compatible Multichannel Audio Codec, 18(6), S. 1550-1561.

Zotter, F., & Frank, M. (2013). Efficient Phantom Source Widening. Archives of Acoustics, 38(1), S. 27-37.

Zotter, F., Frank, M., Kronlachner, M., & Choi, J.-W. (2014). Efficient Phantom Source Widening and Diffuseness in Ambisonics.

The invention claimed is:

1. An apparatus for reproducing a spatially extended sound source comprising a defined position or orientation and geometry in a space, the apparatus comprising:

an interface configured for receiving a listener position;

a projector configured for calculating a projection of a two-dimensional or three-dimensional hull associated with the spatially extended sound source onto a projection plane using the listener position, information on the geometry of the spatially extended sound source, and information on the position of the spatially extended sound source;

a sound position calculator configured for calculating positions of at least two sound sources for the spatially extended sound source using the projection plane; and a renderer configured for rendering the at least two sound sources at the positions to acquire a reproduction of the spatially extended sound source comprising two or more output signals, wherein the renderer is configured to use different sound signals for the different positions, wherein the different sound signals are associated with the spatially extended sound source, wherein the renderer is configured for rendering the at least two sound sources relative to a fixed location and/or orientation of the spatially extended sound source in response to a specific information received.

2. The apparatus of claim 1, further comprising a detector is configured to detect a momentary listener position in the space using a tracking system, or wherein the interface is configured for using position data input via the interface.

3. The apparatus of claim 1, configured for receiving a scene description, the scene description comprising the information on the defined position or orientation and the information on the defined geometry of the spatially extended sound source, and at least one basis sound signal associated with the spatially extended sound source, wherein the apparatus further comprises a scene description parser configured for parsing the scene description to retrieve the information on the defined position or orientation, the information on the defined geometry and the at least one basis sound signal, or wherein the scene description comprises, for the spatially extended sound source, at least two basis sound signals of the at least two basis sound signals and location information for each basis sound signal with respect to the information on the geometry of the spatially extended sound source, and wherein the sound position calculator is configured to use the location information for the at least two basis sound signals when calculating the positions of the at least two sound sources using the projection plane.

4. The apparatus of claim 1, wherein the projector is configured to compute the hull of the spatially extended sound source using the information on the geometry of the spatially extended sound source and to project the hull in a direction towards the listener using the listener position or orientation to acquire the projection of the two-dimensional or three-dimensional hull onto the projection plane, or wherein the projector is configured to project a geometry of the spatially extended sound source as defined by the information on the geometry of the spatially extended sound source in a direction towards to the listener position and to calculate the hull of a projected geometry to acquire the projection of the two-dimensional or three-dimensional hull onto the projection plane.

5. The apparatus of claim 1, wherein the sound position calculator is configured to calculate the sound source positions in the space from hull projection data and the listener position.

6. The apparatus of claim 1, wherein the sound position calculator is configured to calculate the positions so that the at least two sound sources are peripheral sound sources and are located on the projection plane, or wherein the sound position calculator is configured for calculating such that a position of a peripheral sound source of the peripheral sound sources is located on the right of the projection plane with respect to the listener and/or to the left of the projection plane with respect to the listener, and/or on top of the projection plane with respect to the listener and/or at the bottom of the projection plane with respect to the listener.

7. The apparatus of claim 1, wherein the renderer is configured to render the at least two sound sources using panning operations depending on the positions of the sound sources to acquire loudspeaker signals for a predefined loudspeaker setup, or binaural rendering operations using head related transfer functions depending on the positions of the sources to acquire headphone signals.

8. The apparatus of claim 1, wherein a first number of basis source signals is associated with the spatially extended sound source, the first number being one or greater than one, wherein the first number of basis source signals is related to the same spatially extended sound source, wherein the sound position calculator determines a second number of sound sources used for the rendering of the spatially extended sound source, the second number being greater than one, and wherein the renderer comprises one or more decorrelators for generating a decorrelated signal from one or more basis source signals of the first number, wherein the second number is greater than the first number.

9. The apparatus of claim 1, wherein the interface is configured to receive a time-varying position of the listener in the space, wherein the projector is configured to calculate a time-varying projection in the space, wherein the sound position calculator is configured to calculate a time-varying number of sound sources or time-varying positions of the sound sources in the space, and wherein the renderer is configured to render the time varying number of sound sources or the at least two sound sources at the time varying positions in the space as the different sound signals.

10. The apparatus of claim 1, wherein the interface is configured to receive the listener position in six degrees of freedom, and wherein the projector is configured to calculate the projection depending on the six degrees of freedom.

11. The apparatus of claim 1, wherein the projector is configured to calculate the projection as a picture plane such as a plane perpendicular to a sight line of the listener, the picture plane being the projection plane, or to calculate the projection as a spherical surface around a head of the listener, the spherical surface being the projection plane, or to calculate the projection as the projection plane being located at a predetermined distance from a center of the listener's head, or to calculate, as the projection plane, the projection of the hull of the spatially extended sound source from an azimuth angle and an elevation angle being derived from spherical coordinates relative to the perspective of a listener's head, the hull being a convex hull.

12. The apparatus of claim 1, wherein the sound position calculator is configured to calculate the positions so that the positions are uniformly distributed around the projection of the hull, or so that the positions are placed at extremal or peripheral points of the hull projection, or so that the positions are located at horizontal or vertical extremal or peripheral points of the projection of the hull.

13. The apparatus of claim 1, wherein the sound position calculator is configured to determine, in addition to positions for peripheral sound sources, positions for auxiliary sound sources located on or before or behind or within the projection of the hull with respect to the listener.

14. The apparatus of claim 1, wherein the projector is configured to additionally shrink the projection of the hull such as towards a center of gravity of the hull or the projection by a variable or predetermined amount or by different variables or predetermined amounts in different directions such as a horizontal direction and a vertical direction.

15. The apparatus of claim 1, wherein the sound position calculator is configured for calculating such that at least one additional auxiliary sound source is located on the projection plane between a left peripheral sound source and a right peripheral sound source with respect to the listener position, or wherein the sound position calculator is configured for calculating such that at least one additional auxiliary sound source is located on the projection plane between a left peripheral sound source and a right peripheral sound source with respect to the listener position, wherein a single additional auxiliary source is placed in the middle between the left peripheral sound source and the right peripheral sound source, or two or more additional auxiliary sources are placed equidistantly between the left peripheral sound source and the right peripheral sound source.

16. The apparatus of claim 1, wherein the sound position calculator is configured to perform a rotation of the sound source positions advantageously around a center of gravity of the projection in case of a receipt of a circular motion of the listener around the spatially extended sound source via the interface, or in case of a receipt of a rotation of the spatially extended sound source with respect a stationary listener via the interface.

17. The apparatus of claim 1, wherein the renderer is configured to receive, for each sound source, an opening angle depending on the distance between the listener and the sound source and to render the sound source depending on the opening angle.

18. The apparatus of claim 1, wherein the renderer is configured to receive a distance information for each sound source, and wherein the renderer is configured to render the sound source depending on the distance so that a sound source being placed closer to the listener is rendered with more volume compared to a sound source being placed less close to the listener and comprising the same volume.

19. The apparatus of claim 1, wherein the sound position calculator is configured to determine, for each sound source, a distance being equal to the distance of the spatially extended sound source with respect to the listener, or determine a distance of each sound source by a back projection of a location of the sound source on the projection onto the geometry of the spatially extended sound source, and wherein the renderer is configured to configured to rendering the at least two using the information on the distance.

20. The apparatus of claim 1, wherein the information on the geometry is defined as a one-dimensional line or curve, a two-dimensional area such as an ellipse, a rectangle, or a polygon, or a group of polygons, or a three-dimensional body such an ellipsoid, a cuboid or a polyhedral, and/or wherein the information is defined as a parametric description or a polygonal description or a parametric representation of the polygonal description.

21. The apparatus of claim 1, wherein the sound position calculator is configured to determine a number of sound sources depending on a distance of the listener to the spatially extended sound source, wherein a number of sound sources is higher for a smaller distance compared to a smaller number for a greater distance between the listener and the spatially extended sound source.

22. The apparatus of claim 1, configured for receiving information on a spreading introduced by—the spatially extended sound source, and wherein the projector is configured to apply a shrinking operation to the hull or the projection using the information on the spreading for at least partly compensating the spreading.

23. The apparatus of claim 1, wherein the renderer is configured to render, in case of the positions of the sound sources being identical to each other within a defined tolerance range, the sound sources by combining at least two basis sound signals associated with the spatially extended sound source for example using a Givens rotation to acquire rotated basis sound signals and to render the rotated basis sound signals at the positions as the different sound signals.

24. The apparatus of claim 1, wherein the spatially extended sound source has associated therewith a multichannel signal comprising a first channel and a second channel, the first channel being associated to a first portion of the spatially extended object and the second channel being associated to a second portion of the spatially extended object, wherein the first portion is different from the second portion, and wherein the specific information received indicates the rendering, by the renderer, of the at least two sound sources relative to the fixed location and/or orientation of the spatially extended sound source, and wherein the renderer is configured to determine the different sound signals for the different positions using a mapping of the first channel and the second channel to the different positions or using an addition of the first channel and the second channel to acquire the different sound signals for the different positions depending on the listener position and the first portion and the second portion of the spatially extended sound source.

25. The apparatus of claim 24, wherein the first portion is a left portion and the second portion is a right portion of the spatially extended sound source, wherein, when the listener position is in front of the spatially extended sound source, the renderer is configured to use, for a sound source position to the left of the user, the first channel and for a position to the right of the user, the second channel, or wherein, when the listener position is behind of the spatially extended sound source, the renderer is configured to use, for a sound source position to the left of the user, the second channel and for a position to the right of the user, the first channel, or wherein, when the listener position is at a side of the spatially extended sound source, the renderer is configured to use, for a sound source position to the left of the user, an addition of the first channel and the second channel, and for a position to the right of the user, the addition of the first channel and the second channel, or wherein, when the listener position is at a side of the spatially extended sound source, the renderer is configured to use, for a sound source position to the left of the user, a weighted addition of the first channel and the second channel, and for a position to the right of the user, the weighted addition of the first channel and the second channel, wherein weighting factors for the weighted addition are determined such that a weighting factor for a channel associated to a portion of the spatially extended sound source being closer to the listener position is greater than a weighting factor for another channel associated to another portion of the spatially extended sound source being further away from the listener position, or wherein, when the listener position is obliquely with respect to the spatially extended sound source, the renderer is configured to use, for a sound source position to the left of the user, a first weighted addition of the first channel and the second channel, and for a position to the right of the user, a second weighted addition of the first channel and the second channel, wherein weighting factors for the weighted additions are determined such that a weighting factor for a channel associated to a portion of the spatially extended sound source being closer to sound source position is greater than a weighting factor for another channel associated to another portion of the spatially extended sound source being further away to the sound source position.

26. The apparatus of claim 1, configured for receiving a description for the spatially extended sound source, the description comprising a description element indicating a first number of different basis sound signals for the spatially extended sound source included in the description or in an encoded audio signal received by the apparatus, the number being one or greater than one, reading the description element and retrieving the first number of different basis sound signals for the spatially extended sound source included in the description or in the encoded audio signal, and wherein the sound position calculator determines a second number of sound sources used for the rendering of the spatially extended sound source, the second number being greater than one, and wherein the renderer is configured to generate, depending on the first number extracted from the description, a third number of one or more decorrelated signals, the third number being derived from a difference between the second number and the first number, or receiving, as the specific information, a flag or a bitstream or description element or an information indicating an absolute anchoring of the one or more different basis sound signals for the spatially extended sound source relative to the fixed location or orientation of the spatially extended sound source, and wherein the renderer is configured for rendering the at least two sound sources relative to the fixed location and/or orientation of the spatially extended sound source in response to the bitstream or description element or the flag or the information, or receiving, as the specific information received, a flag or a bitstream or description element or an information indicating in one state an absolute anchoring of the one or more different basis sound signals for the spatially extended sound source relative to the fixed location or orientation of the spatially extended sound source and in the other state a different processing compared to the one state, and wherein the renderer is configured for rendering the at least two sound sources relative to the fixed location and/or orientation of the spatially extended sound source in response to the flag or the bitstream or description element or information indicating the one state and for rendering the at least two sound sources in a different mode comprising the different processing in the other state.

27. An apparatus for generating a description for a spatially extended sound source, the apparatus comprising:

a sound provider configured for providing one or more different basis sound signals for the spatially extended sound source;

a geometry provider configured for calculating information on a geometry for the spatially extended sound source; and an output data former configured for generating the description, the description comprising the one or more different basis sound signals, and the information on the geometry, wherein the output data former is configured to introduce, into the description, an information or description element or flag indicating an absolute anchoring of the one or more different basis sound signals for the spatially extended sound source to a fixed location or orientation of the spatially extended sound source.

28. The apparatus of claim 27, wherein the information on the geometry comprises position information indicating a position of the spatially extended sound source in a space.

29. The apparatus of claim 27, comprising:

wherein the output data former is configured for introducing, into the description, an information on the individual location for each basis sound signal of the one or more different basis sound signals such that the information on the individual location indicates the location of the corresponding basis sound signal.

30. The apparatus of claim 27, wherein the sound provider is configured for providing at least two different basis sound signals for the spatially extended sound source, and wherein the output data former is configured for generating the description so that the description comprises the at least two different basis sound signals and the individual location information for each basis sound signal of the at least two different basis sound signals with respect to the information on the geometry of the spatially extended sound source.

31. The apparatus of claim 27, wherein the sound provider is configured to perform a recording of a natural sound source at a single or multiple microphone positions or orientations, or to derive a sound signal from a single or several basis signals by one or more decorrelation filters.

32. The apparatus of claim 27, wherein the sound provider is configured to bit-rate compress the one or more basis sound signals using an audio signal encoder, and wherein the output data former is configured to use the bit-rate compressed one or more basis sound signals for the spatially extended sound source.

33. The apparatus of claim 27, wherein the geometry provider is configured to derive, from a geometry of the spatially extended sound source, a parametric description or a polygonal description or a parametric representation of the polygonal description, and wherein the output data former is configured to introduce, into the description, the parametric description or the polygonal description or the parametric representation of the polygonal description as the information on the geometry.

34. The apparatus of claim 27, wherein the output data former is configured to introduce, into the description, a description element indicating a number of the one or more different basis sound signals for the spatially extended sound source included in the description or included in an encoded audio signal associated with the description, the number being one or greater than one.

35. The apparatus of claim 27, wherein the flag or the description element or the information indicating the absolute anchoring of the one or more different basis sound signals for the spatially extended sound source refers to an absolute location or an absolute orientation of the spatially extended sound source, or wherein a syntax element comprises relative channel positions, and wherein the flag or the description element or the information comprises a flag or a prefix or a certain letter indicating the anchoring, or wherein the sound provider is configured for providing at least two different basis sound signals for the spatially extended sound source, and wherein the flag or the description element or the information is associated with the at least two different basis sound signals, or wherein the at least two different sound signals relate to a first channel associated with a left portion of a piano and to a second channel associated with a right portion of the piano.

36. A method for reproducing a spatially extended sound source comprising a defined position or orientation and geometry in a space, the method comprising:

receiving a listener position;

calculating a projection of a two-dimensional or three-dimensional hull associated with the spatially extended sound source onto a projection plane using the listener position, information on the geometry of the spatially extended sound source, and information on the position of the spatially extended sound source;

calculating positions of at least two sound sources for the spatially extended sound source using the projection plane; and rendering the at least two sound sources at the positions to acquire a reproduction of the spatially extended sound source comprising two or more output signals, wherein the rendering comprises using different sound signals for the different positions, wherein the different sound signals are associated with the spatially extended sound source, wherein the rendering comprises rendering the at least two sound sources relative to a fixed location and/or orientation of the spatially extended sound source in response to a specific information received.

37. A method of generating a description for a spatially extended sound source, the method comprising:

providing one or more different basis sound signals for the spatially extended sound source;

providing information on a geometry for the spatially extended sound source; and generating the description, the description comprising the one or more different basis sound signals, and the information on the geometry for the spatially extended sound source, wherein the generating comprises introducing, into the description, a flag, a description element or an information indicating an absolute anchoring of the one or more different basis sound signals for the spatially extended sound source to a fixed location or orientation of the spatially extended sound source.

38. The method of claim 37, wherein the information on the geometry for the spatially extended sound source comprises position information of the spatially extended sound source in a space.

39. The method of claim 37, wherein the generating the description comprises introducing, into the description, information on the individual location for each basis sound signal of the one or more different basis sound signals.

40. The method of claim 37, wherein the providing comprises providing at least two different basis sound signals for the spatially extended sound source, and wherein the generating the description is performed so that the description comprises the at least two different basis sound signals and the individual location information for each basis sound signal of the at least two different basis sound signals such that the information indicates the location of the corresponding basis sound signal with respect to the information on the geometry of the spatially extended sound source.

41. The method of claim 37, wherein the generating the description comprises introducing, into the description, a description element indicating a number of the one or more different basis sound signals for the spatially extended sound source included in the description or included in an encoded audio signal associated with the description, the number being one or greater than one.

42. A non-transitory digital storage medium having stored thereon a computer program for performing a method for reproducing a spatially extended sound source comprising a defined position or orientation and geometry in a space, the method comprising:

receiving a listener position;

calculating a projection of a two-dimensional or three-dimensional hull associated with the spatially extended sound source onto a projection plane using the listener position, information on the geometry of the spatially extended sound source, and information on the position of the spatially extended sound source;

calculating positions of at least two sound sources for the spatially extended sound source using the projection plane; and rendering the at least two sound sources at the positions to acquire a reproduction of the spatially extended sound source comprising two or more output signals, wherein the rendering comprises using different sound signals for the different positions, wherein the different sound signals are associated with the spatially extended sound source, wherein the rendering comprises rendering the at least two sound sources relative to a fixed location and/or orientation of the spatially extended sound source in response to a specific information received, when said computer program is run by a computer.

43. A non-transitory digital storage medium having stored thereon a computer program for performing a method of generating a description for a spatially extended sound source, the method comprising:

providing one or more different basis sound signals for the spatially extended sound source;

providing information on a geometry for the spatially extended sound source; and generating the description, the description comprising the one or more different basis sound signals, and the information on the geometry for the spatially extended sound source, wherein the generating comprises introducing, into the description, a flag, a description element or an information indicating an absolute anchoring of the one or more different basis sound signals for the spatially extended sound source to a location or orientation of the spatially extended sound source, when said computer program is run by a computer.

* * * * *